United States Patent
McBride et al.

(10) Patent No.: US 7,509,291 B2
(45) Date of Patent: Mar. 24, 2009

(54) FORMATTING VALUE-BEARING ITEM INDICIA

(75) Inventors: Kenneth Thomas McBride, Hermosa Beach, CA (US); Damon Cleckler, Altadena, CA (US); Keith David Bussell, Los Angeles, CA (US)

(73) Assignee: Stamps.com Inc., Los Angeles, CA (US)

( * ) Notice: Subject to any disclaimer, the term of this patent is extended or adjusted under 35 U.S.C. 154(b) by 0 days.

(21) Appl. No.: 11/635,871

(22) Filed: Dec. 8, 2006

(65) Prior Publication Data

US 2007/0100672 A1 May 3, 2007

Related U.S. Application Data

(63) Continuation-in-part of application No. 10/688,548, filed on Oct. 17, 2003, now Pat. No. 7,162,460.

(51) Int. Cl.
*G06F 17/60* (2006.01)
(52) U.S. Cl. .......................................... 705/60; 705/62
(58) Field of Classification Search .................. 705/60, 705/62
See application file for complete search history.

(56) References Cited

U.S. PATENT DOCUMENTS

| | | | |
|---|---|---|---|
| 4,872,706 A | 10/1989 | Brewen et al. | |
| 5,573,277 A | 11/1996 | Petkovsek | |
| 5,626,286 A | 5/1997 | Petkovsek | |
| 5,651,238 A * | 7/1997 | Belec et al. | 53/504 |
| 5,717,597 A | 2/1998 | Kara | |
| 5,737,729 A | 4/1998 | Denman | |
| 5,801,944 A | 9/1998 | Kara | |
| 5,812,991 A | 9/1998 | Kara | |
| 5,819,240 A | 10/1998 | Kara | |
| 5,848,401 A | 12/1998 | Goldberg | |
| 5,923,406 A | 7/1999 | Brasington et al. | |
| 5,944,461 A | 8/1999 | Kanbar | |
| 5,995,985 A | 11/1999 | Cai | |

(Continued)

FOREIGN PATENT DOCUMENTS

JP 2005215905 * 8/2005

OTHER PUBLICATIONS

U.S. Appl. No. 09/585,025, filed Jun. 2000, Piers Lingle, et al.

(Continued)

*Primary Examiner*—Pierre E Elisca
(74) *Attorney, Agent, or Firm*—Khorsandi Patent Law Group, A Law Corporation; Marilyn R. Khorsandi

(57) ABSTRACT

Various embodiments of the present invention would provide methods and systems for generating and printing an identifier on a sheet of label stock that comprises a plurality of same-sized labels. In the exemplary embodiment, the identifier would comprise an identification of a media type of the sheet of label stock, and would further comprise an identification of an orientation for printing value-bearing item indicia, such as postage indicia, with respect to each label on the sheet of label stock. The orientation for printing value-bearing item indicia, such as postage indicia, would correspond to an orientation selection by a user that ordered the labels (sometimes referred to herein as the "ordering user").

26 Claims, 18 Drawing Sheets

U.S. PATENT DOCUMENTS

| | | | |
|---|---|---|---|
| 6,010,156 | A | 1/2000 | Block |
| 6,208,980 | B1 | 3/2001 | Kara |
| 6,209,920 | B1 | 4/2001 | Fabel |
| 6,244,763 | B1 | 6/2001 | Miller |
| 6,296,404 | B1 | 10/2001 | Pierce et al. |
| 6,311,240 | B1 * | 10/2001 | Boone et al. .......... 710/74 |
| 6,415,983 | B1 | 7/2002 | Ulver et al. |
| 6,419,782 | B1 | 7/2002 | Johnson et al. |
| 6,427,021 | B1 | 7/2002 | Fischer et al. |
| 6,461,063 | B1 | 10/2002 | Miller |
| 6,505,980 | B1 | 1/2003 | Allday |
| 6,594,374 | B1 | 7/2003 | Beckstrom et al. |
| 6,595,412 | B2 | 7/2003 | Manduley |
| 6,655,579 | B1 | 12/2003 | Delman et al. |
| 6,687,684 | B1 | 2/2004 | Whitehouse |
| 6,701,304 | B2 | 3/2004 | Leon |
| 6,722,563 | B1 | 4/2004 | Johnson et al. |
| 7,085,725 | B1 | 8/2006 | Leon |
| 7,127,434 | B2 | 10/2006 | Burningham |
| 7,149,726 | B1 | 12/2006 | Lingle et al. |
| 7,162,460 | B2 | 1/2007 | Cleckler et al. |
| 7,191,158 | B2 | 3/2007 | Ogg et al. |
| 7,194,957 | B1 | 3/2007 | Leon et al. |
| 7,243,842 | B1 | 7/2007 | Leon et al. |
| 2001/0042052 | A1 | 11/2001 | Leon |
| 2002/0033598 | A1 | 3/2002 | Beasley |
| 2002/0046195 | A1 | 4/2002 | Martin |
| 2002/0083020 | A1 | 6/2002 | Leon |
| 2002/0149195 | A1 | 10/2002 | Beasley |
| 2002/0190117 | A1 | 12/2002 | Manduley |
| 2003/0140017 | A1 | 7/2003 | Patton et al. |
| 2004/0215523 | A1 | 10/2004 | Wulff et al. |
| 2004/0254898 | A1 | 12/2004 | Parker et al. |
| 2005/0080751 | A1 | 4/2005 | Burningham |
| 2005/0114276 | A1 | 5/2005 | Hunter et al. |
| 2005/0125367 | A1 | 6/2005 | Ogg et al. |
| 2005/0144145 | A1 | 6/2005 | Ogg et al. |
| 2005/0195214 | A1 | 9/2005 | Reid et al. |
| 2006/0116971 | A1 | 6/2006 | Beckstrom et al. |
| 2007/0198441 | A1 | 8/2007 | Kara |

OTHER PUBLICATIONS

U.S. Appl. No. 09/905,329, filed Jul. 2001, Jonathan Goodwin, et al.

U.S. Appl. No. 09/975,532, filed Oct. 2001, Craig Ogg, et al.

U.S. Appl. No. 10/197,044, filed Jul. 2002, Lawrence Raju, et al.

U.S. Appl. No. 10/994,698, filed Nov. 2004, J P Leon, et al.

U.S. Appl. No. 11/435,453, filed May 2006, John Roland Clem.

U.S. Appl. No. 11/475,298, filed Jun. 2006, Kenneth Thomas McBride, et al.

"Picture It Postage by endicia," http://www.pictureitpostage.com/PhotoEditor/EditImage.cfm, Endicia; printed on Nov. 17, 2006; 2 pages.

"Zazzle Custom Stamps for Business; Zazzel.com Pitney Bowes," http://www.zazzle.com/stamps/design.asp, Pitney Bowes; printed on Nov. 16, 2006; 2 pages.

"Need more trackits?", 4 pages, http://www.trackmymail.com, 8341 Beechcraft Ave., Gaithersburg, MD 20879, 888-444-9972 or 310-924-2373, not dated.

Stamps.com Inc., Santa Monica, CA 90405, Stamps.com 3-part Multi-Purpose Labelc SDC-3100, 1 Page.

Stamps.com Inc., Santa Monica, CA 90405, Stamps.com 2-part Window Envelope Labels SDC-2300, 1 Page.

"Multicolor Easily Printable Bar Code", IBM Tech. Discl. Bull., vol. 14, No. 3, p. 783 (Aug. 1971).

Canada Post Corporation; "Collecting—Picture Postage", 3 pages, ©2004, http://www.canadapost.ca/personal/collecting/default-e.asp?stamp=postage.

Personal Postage Corporation; "Personal Postage", 1 page, Undated, http://www.personalpostage.com, Printed Jul. 20, 2004.

Personal Postage Corporation; "Personal Postage", 2 pages, Undated, http://www.personalpostage.com/home.htm, printed Jul. 20, 2004.

Canada Post International, LLC; "Personal Postage", 2 pages, Undated, http://www.personalpostage.com/Canada%20Post.htm, printed Jul. 20, 2004.

Personal Postage Corporation; "Quick Reference Guide"; 8 pages; Undated; http://www.personalpostage.com/Om_page1.htm, page2. htm, page3.htm, page4.htm, printed Jul. 20, 2004.

Avery Dennison Corporation; "Avery Creative Postage Labels", 4 pages, http://www.creativepostagelabels.avery.com/postage_aap. htm; © 1996-2004.

Avery Dennison Corporation; "Avery Creative Postage Labels", 2 pages, http://www.creativepostagelabels.avery.com/order.php; © 1996-2004.

Canadian Post; picture stamp sample, undated, prior to Jul. 27, 2004, 1 page.

Canadian Post; Set of pictures and address labels; sample, undated, prior to Jul. 27, 2004, 1 page.

"It's in the mail: a personalized postcode for life", an article about Royal Mail picture stamps, dated unknown (prior to Jul. 27, 2004), publication unknown, 1 page.

Australian Post sample; Jul. 7-16, 2000; Anaheim, CA, 1 page.

"What's selling: from bricks and mortar to bricks and clicks", Playthings Magazine, Feb. 1, 2003.

Porter, William "Personal Postage Canadians take to vanity stamps in very big way", Denver Post, Jul. 9, 2000.

Kenneth Thomas McBride et al; Customized Computer-Based Value-Bearing Item Quality Assurance; U.S. Appl. No. 10/994,914; filed Nov. 22, 2004; Pages Throughout.

Kyle Huebner et al.; Printing Of Computer-Based Value-Bearing Items; U.S. Appl. No. 10/994,728; filed Nov. 22, 2004; Pages Throughout.

John Roland Clem et al.; Quality Assurance Of Image-Customization Of Computer-Based Value-Bearing Items; U.S. Appl. No. 11/114,964; filed Apr. 25, 2005; Pages Throughout.

JP Leon; Systems And Methods For Creating And Providing Shape-Customized, Computer-Based, Value-Bearing Items; U.S. Appl. No. 11/644,458; filed Dec. 20, 2006; Pages Throughout.

JP Leon et al.; Computer-Based Value-Bearing Item Customization Security; U.S. Appl. No. 11/729,148; filed Mar. 27, 2007; pp. 1-6 and 85-93, and Preliminary Amendment, Throughout.

JP Leon et al.; Computer-Based Value-Bearing Item Customization Security; U.S. Appl. No. 11/729,239; pp. 1-6 and 85-93, and Preliminary Amendment, Throughout.

United States Patent Office; Office Action dated Apr. 17, 2008 for Kenneth Thomas McBride et al; Customized Computer-Based Value-Bearing Item Quality Assurance; U.S. Appl. No. 10/944,914; filed Nov. 22, 2004.

United States Patent Office; Office Action dated May 29, 2008 for Huebner et al; Printing of Computer-Based Value-Bearing Items; U.S. Appl. No. 10/994,728; filed Nov. 22, 2004.

United States Patent Office; Office Action dated Aug. 19, 2008 for Leon et al; Image Customization of Computer-Based Value-Bearing Items; U.S. Appl. No. 10/994,698; filed Nov. 22, 2004.

United States Patent Office; Notice of Allowance dated Jan. 5, 2007 for Leon et al; Computer-Based Value-Bearing Item Customization Security; U.S. Appl. No. 10/994,768; filed Nov. 22, 2004.

United States Patent Office; Office Action dated Nov. 8, 2005 for Raju et al.; Generic Value Bearing Item Labels; U.S. Appl. No. 10/197,044; filed Jul. 16, 2002.

United States Patent Office; Office Action dated Aug. 11, 2006 for Raju et al.; Generic Value Bearing Item Labels; U.S. Appl. No. 10/197,044; filed Jul. 16, 2002.

United States Patent Office; Office Action dated Feb. 15, 2007 for Raju et al.; Generic Value Bearing Item Labels; U.S. Appl. No. 10/197,044; filed Jul. 16, 2002.

United States Patent Office; Office Action dated Aug. 17, 2007 for Raju et al.; Generic Value Bearing Item Labels; U.S. Appl. No. 10/197,044; filed Jul. 16, 2002.

United States Patent Office; Office Action dated Dec. 13, 2007 for Raju et al.; Generic Value Bearing Item Labels; U.S. Appl. No. 10/197,044; filed Jul. 16, 2002.

United States Patent Office; Notice of Allowance dated Jun. 19, 2008 for Raju et al.; Generic Value Bearing Item Labels; U.S. Appl. No. 10/197,044; filed Jul. 16, 2002.

United States Patent Office; Office Action dated Dec. 14, 2004, for Raju et al.; System and Methods for Providing Computer-Based Postage Stamps; U.S. Appl. No. 09/975,532; filed Oct. 10, 2001.

United States Patent Office; Notice of Allowance dated May 16, 2005, for Raju et al.; System and Methods for Providing Computer-Based Postage Stamps; U.S. Appl. No. 09/975,532; filed Oct. 10, 2001.

United States Patent Office; Notice of Withdrawal From Issue dated Nov. 30, 2005, for Raju et al.; System and Methods for Providing Computer-Based Postage Stamps; U.S. Appl. No. 09/975,532; filed Oct. 10, 2001.

United States Patent Office; Office Action dated Apr. 12, 2006, for Raju et al.; System and Methods for Providing Computer-Based Postage Stamps; U.S. Appl. No. 09/975,532; filed Oct. 10, 2001.

United States Patent Office; Notice of Allowance dated Sep. 6, 2006, for Raju et al.; System and Methods for Providing Computer-Based Postage Stamps; U.S. Appl. No. 09/975,532; filed Oct. 10, 2001.

United States Patent Office; Office Action dated Sep. 18, 2008 for Ogg et al., Outbound Mail Piece Tracking; U.S. Appl. No. 10/747,936; filed Dec. 29, 2003.

United States Patent Office; Office Action dated Apr. 16, 2007 for Ogg et al.; Computer Postage and Mail Tracking Labels; U.S. Appl. No. 10/731,992; filed Dec. 8, 2003.

United States Patent Office; Office Action dated Nov. 1, 2007 for Ogg et al.; Computer Postage and Mail Tracking Labels; U.S. Appl. No. 10/731,992; filed Dec. 8, 2003.

United States Patent Office; Office Action dated May 28, 2008 for Ogg et al; Computer Postage and Mail Tracking Labels; U.S. Appl. No. 10/731,992; filed Dec. 8, 2003.

United States Patent Office; Notice of Allowance dated Sep. 5, 2006 for Media Type Identification; U.S. Appl. No. 10/688,548; filed Oct. 17, 2003.

* cited by examiner

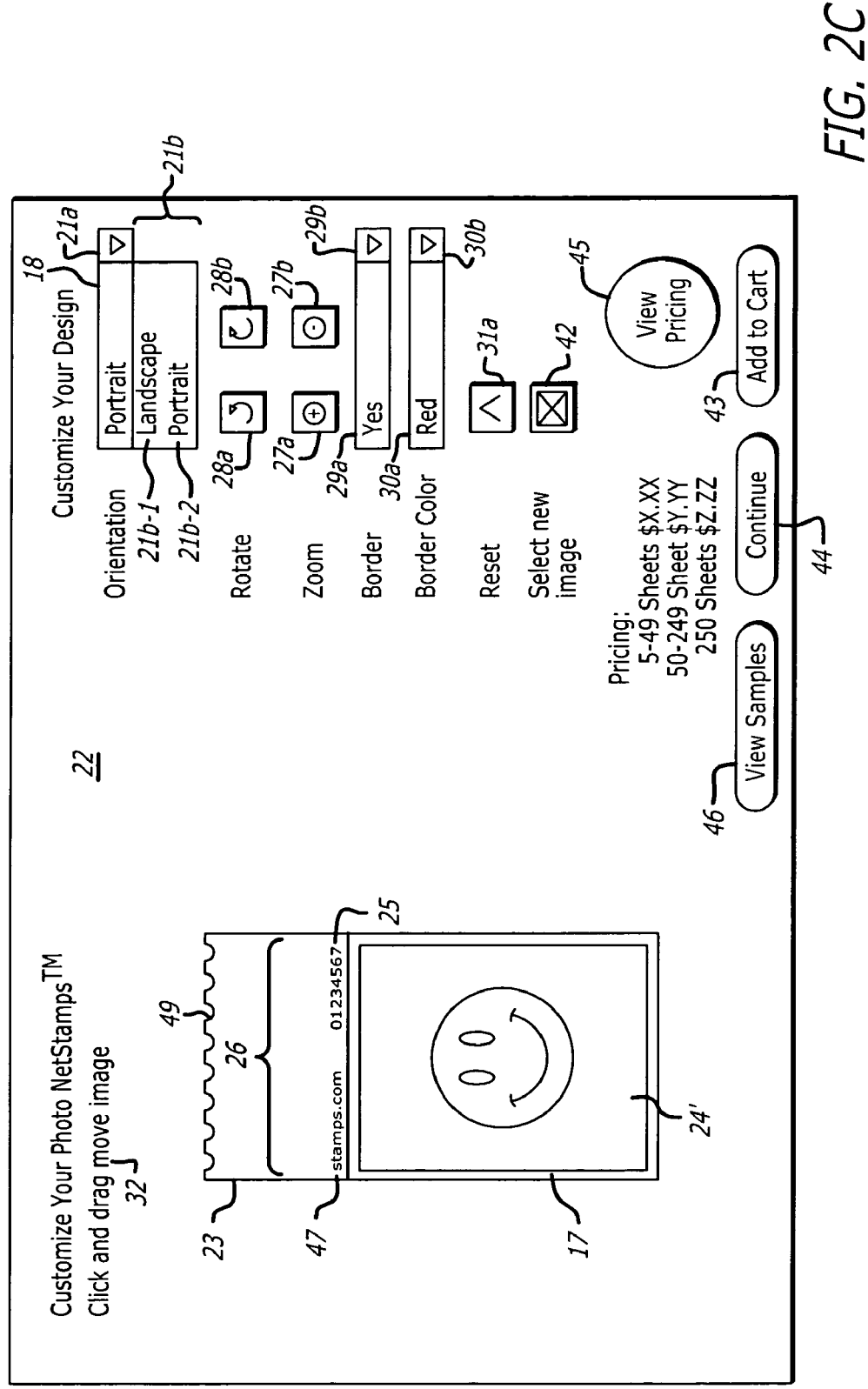

| ML | MP | ML&Mp | | |
|---|---|---|---|---|
| nn | nn | n.nn | nn.nn | nnn.nn |
| 02 cents | 02 cents | | | |
| 39 cents | 39 cents | | | |
| | | $4.05 | $77.05 | |
| | | $4.05 | $77.05 | $190.05 |
| | | | $77.05 | $190.05 |

FIG. 13

FORMATTING VALUE-BEARING ITEM INDICIA

CROSS REFERENCE TO RELATED APPLICATIONS

This is a continuation-in-part of U.S. patent application Ser. No. 10/688,548, entitled "MEDIA TYPE IDENTIFICATION," filed on Oct. 17, 2003, now U.S. Pat. No. 7,162,460 (sometimes referred to herein as the "FORM FACTOR Application"), the contents of which are hereby expressly incorporated by reference herein for all purposes as if fully set forth herein.

The entire contents and disclosures of co-pending U.S. patent application Ser. No. 10/197,044, entitled "Generic Value Bearing Item Labels", filed Jul. 16, 2002, to be commonly assigned, which is a continuation-in-part of U.S. patent application Ser. No. 09/975,532, filed Oct. 10, 2001, entitled "SYSTEM AND METHOD FOR PROVIDING COMPUTER-BASED POSTAGE STAMPS" which claims the benefit of U.S. Provisional Application No. 60/239,424 filed Oct. 10, 2000, entitled "A SYSTEM AND METHOD FOR PROVIDING COMPUTER BASED POSTAGE STAMPS" are hereby expressly incorporated herein by reference for all purposes as if fully set forth herein.

The entire contents and disclosures of co-pending U.S. patent application Ser. No. 09/905,329, filed Jul. 13, 2001, entitled "WEB-ENABLED VALUE BEARING ITEM PRINTING" and co-pending U.S. patent application Ser. No. 09/585,025, filed Jun. 1, 2000 and entitled "ON-LINE VALUE BEARING ITEM PRINTING", to be commonly assigned, are hereby expressly incorporated herein by reference for all purposes as if fully set forth herein.

The entire contents and disclosures of co-pending U.S. patent application Ser. No. 11/475,298, entitled "IMAGE-CUSTOMIZED LABELS ADAPTED FOR BEARING COMPUTER-BASED, GENERIC, VALUE-BEARING ITEMS, AND SYSTEMS AND METHODS FOR PROVIDING IMAGE-CUSTOMIZED LABELS" (Filed: Jun. 26, 2006) (sometimes referred to herein as the "PHOTONETS-TAMPS™ Application"), to be commonly assigned, is hereby expressly incorporated herein by reference for all purposes as if fully stated here.

FIELD OF THE INVENTION

The field of the present invention is printing of value bearing items, and more particularly, formatting value-bearing item indicia for printing.

BACKGROUND OF THE INVENTION

Value Bearing Items ("VBI") are known in the art. Value Bearing Items ("VBI") include among other things, postage, coupons, tickets, gift certificates, currency, money orders, vouchers and the like.

Computer-based VBI systems are also known in the art. As an example of computer-based VBI systems, the above-incorporated WEB-ENABLED VALUE BEARING ITEM PRINTING application and the above-incorporated ON-LINE VALUE BEARING ITEM PRINTING application disclose systems and methods for creating and printing various types of VBI.

As another example of a computer-based VBI system, U.S. patent application Ser. No. 09/975,532 entitled "SYSTEM AND METHOD FOR PROVIDING COMPUTER-BASED POSTAGE STAMPS" (hereinafter referred to as the "Generic VBI Invention"), the contents and disclosures of which are hereby expressly incorporated in full herein for all purposes as if fully stated here, discloses systems and methods for the creation of generic VBI postage, such that no intended recipient address need be specified, verified or indicated in any way on the created postage. The systems and methods disclosed in the Generic VBI Invention provided for the generation and printing of generic VBI, such as postage, that may be used at any time for any recipient, much like pre-printed postage printed and sold by the United States Postal Service ("USPS"). The term "generic postage" as used herein refers to postage that is non-recipient specific and/or non-date specific.

The Generic VBI Invention disclosed a user interface via which a user could enter postage specifications, such as a mail class and an amount. Some VBI systems, including the generic VBI Invention, provide a user with an option as to media types on which to print VBI. For example, some embodiments of the Generic VBI Invention would provide an option to a user to use any one of various types of multi-part label sets on which to print generic VBI indicia, such as generic postage indicia. For example, a computer-based generic VBI system embodiment could provide alternative selections of single-feed sheet labels and label rolls, such as through a user interface display screen drop-down menu.

Media type, as that term is used herein, is the type of physical media on which something, such as, VBI, is to be printed. A particular-dimensioned envelope is a media type. A particular-dimensioned card is another-media type. A particular-dimensioned piece of paper is yet another media type. Various label manufacturers could provide distinctly-dimensioned multi-part label set configurations, each label set configuration being yet another media type. Further still, single-part label set configurations could provide yet further distinctly dimensioned labels featuring distinct spatial relationships between each label on a sheet of labels, and particular orientations (for example, landscape or portrait orientation) of the labels on the sheet.

As was disclosed in the FORM FACTOR Application, each distinct media type may have respective, distinct formatting requirements. For example, spatial relationships between components of what is to be printed, e.g., VBI, could vary from one media type to another. As another example of distinct formatting requirements, spatial relationships between components of what is to be printed, e.g., VBI, and the dimensions of the media type on which it is to be printed, could vary from one media type to another. That is, for a first distinct single-part label set configuration having a first set of dimensions, a bar code may need to be printed in a particular location on each label of the particular label set. On the other hand, if a second single-part label set configuration were used having a second set of dimensions that differ from the first set of dimensions of the first distinct single-part label set, then if the format for the first distinct label set configuration were used to format and print a bar code on the second single-part media type, doing so could result in the bar code being printed in a position outside, or partially outside, of the perimeter of a particular label.

The FORM FACTOR Application disclosed various embodiments providing exemplary methods and systems for automatically selecting a media type for which to format Value-Bearing Item indicia based on a user's input of a secured paper control number. The FORM FACTOR Application further disclosed various embodiments providing exemplary methods for selecting a media type format for which to generate value-bearing item indicia, the exemplary methods comprising receiving an input of a secured paper control number, and identifying a media type format corresponding to the secured paper control number. The FORM FACTOR Application yet further disclosed various embodiments providing exemplary methods for determining a media type for a particular unit of secured paper, the exemplary methods comprising receiving an input of a media type identifier, wherein the media type identifier is displayed on the particular unit of secured paper, and retrieving from a memory storage a record corresponding to the media type identifier, wherein said record defines a media type format corresponding to the media type identifier. The FORM FACTOR Application yet further disclosed various embodiments providing exemplary methods for identifying to a system, a secured paper media type, the exemplary methods comprising displaying on a particular unit of secured paper a secured paper identifier wherein the particular unit of secured paper corresponds to a particular media type, said media type characterized by a set of media type information, and recording on a database a relationship between the secured paper identifier and the corresponding media type information.

As compared to identifying different media types to a computer-based VBI system as disclosed in the FORM FACTOR Application for, various embodiments of image-customization VBI systems, such as, for example, as disclosed in the PHOTONETSTAMPS™ Application, provide users the option of ordering image-customized labels that display a user-provided, user-manipulated image and are adapted for receiving printing of generic VBI. Various image-customization VBI embodiments provide alternative label "footprints," or media types, on which to display user-supplied, user-manipulated images. Various image-customization VBI embodiments may provide a user with the ability to upload (or otherwise import) a user-provided image, such as a photograph, and then manipulate the image in various ways with respect to a particular label "footprint."

In an image-customization VBI embodiment, even for a single label "footprint," different user's may manipulate their respective user-provided image in different orientations. And yet, image-customization VBI embodiments have not provided an option to the user of manipulating an orientation of human readable postage indicia in an orientation that coordinates with the user-provided, user-manipulated image. Further, for a single media type, or label "footprint," there has not been a way for a user to identify to a generic VBI system to format human-readable postage indicia in an orientation that coordinates with the user-provided, user-manipulated image. Even if the underlying media type is the same, variable pre-printed content on a first sheet of labels comprising a first plurality of same-sized, single-part labels, could require different VBI formatting as compared to alternative pre-printed content on a second sheet of labels comprising a second plurality of the same-sized, single-part labels.

Various embodiments of the present invention would provide methods and systems for generating and printing an identifier on a sheet of label stock that comprises a plurality of same-sized labels. The identifier would comprise an identification of a media type of the sheet of label stock, and would further comprise an identification of an orientation for printing value-bearing item indicia, such as postage indicia, with respect to each label on the sheet of label stock. The orientation for printing value-bearing item indicia, such as postage indicia, would correspond to an orientation selection by a user that ordered the labels (sometimes referred to herein as the "ordering user").

In various embodiments, the labels would bear an image provided, or selected, by the ordering user. In various embodiments, the labels would be produced without any value-bearing item indicia, such as postage indicia, but would be adapted for receiving generic value-bearing item indicia, such as generic postage indicia. That is, in various embodiments, the labels would be produced for subsequent use in client computer printing of generic value-bearing item indicia, such as generic postage indicia.

In various embodiments, the ordering user would be presented with a plurality of label "footprints" from which to choose for ordering image-customized, labels adapted for bearing generic value-bearing item indicia, such as generic postage indicia. Each of the plurality of "footprints" would comprise distinct width and height dimensions.

A first sheet of label stock bearing labels comprising a first label footprint would comprise a first media type. A second sheet of label stock bearing labels comprising a second label footprint would comprise a second media type.

The first sheet of label stock would comprise a plurality of labels, wherein each of the plurality of labels on the first sheet of label stock would comprise the first label footprint. Each label on the first sheet of label stock would comprise a first height and a first width that would be the same height and width of all of the other labels on the first sheet of label stock—that is, the first sheet of label stock would comprises a plurality of same-sized labels having a first set of dimensions.

The second sheet of label stock would comprise a plurality of labels, wherein each of the plurality of labels on the second sheet of label stock would comprise the second label footprint. Each label on the second sheet of label stock would comprise a second height and a second width that would be the same height and width of all of the other labels on the second sheet of label stock—that is, the second sheet of label stock would comprise a plurality of same-sized labels having a second set of dimensions.

In various embodiments, the ordering user would select one label footprint from the plurality of label footprints as the media type on which to print image-customized labels adapted for receiving generic postage indicia. In various embodiments, the ordering user would be provided with a user interface for designing the labels. Using the user interface, the ordering user would provide an image, such as by uploading an image. In the exemplary embodiment, the user interface would further provide the ordering user with an opportunity to select an image from a library, a gallery, or other collection, of images.

Using the user interface, the ordering user would indicate manipulation instructions for manipulating the image as the ordering user would like the image to be printed on the labels. Using the user interface, the ordering user would indicate an orientation, either landscape or portrait, for the labels. The user would also indicate a number of sheets or rolls (units) of labels being ordered.

Once the user submitted an order, the relevant embodiment would generate an order identifier. For each label ordered, various embodiments would generate a label identifier, such as, for example, a serial number. For each unit of labels ordered, such as a sheet or a roll, various embodiments would generate a unit identifier, such as a sheet identifier or a roll identifier. In various embodiments, the unit identifier would comprise, among other things, an indication of the media type of the unit of labels, and an indication of the orientation of the labels with respect to the unit of labels. In alternative embodiments, the unit identifier would comprise, among other things, an indication of the media type of the unit of labels, but would not comprise an indication of the orientation of the labels with respect to the unit of labels.

For an order, various embodiments would save in a computer accessible memory: the order identifier; the media type, or label footprint, corresponding to the order; each unit identifier corresponding to the order; each label identifier corresponding to each unit; and a set of customization features corresponding to the ordered labels. The set of customization features would include, for example, the image provided by the ordering user, the ordering user's manipulation instructions for the image, and the label orientation indicated by the ordering user.

In various embodiments, once the ordered units of the labels are printed bearing the image provided by the ordering user, the ordered units of labels would be shipped to the ordering user, or to a person of the ordering user's identification, as the case may be (the "receiving user"). The labels would be usable by the receiving user for printing generic value-bearing item indicia, such as generic postage indicia.

In various embodiments of the present invention, to print generic value-bearing item indicia, such as generic postage indicia, the receiving user would use a client computer to communicate with the relevant embodiment of the present invention. In various embodiments, in order to print generic value-bearing item indicia, such as generic postage indicia, on one of the labels, the receiving user would input or otherwise indicate to the relevant embodiment, among other things: 1) the unit identifier, such as the sheet identifier on the sheet of label stock bearing the particular label on which the receiving user wants to print generic value-bearing item indicia; and 2) the label identifier on the particular label on which the receiving user wants to print the generic value-bearing item indicia. The receiving user would also indicate an amount of value, such as postage, for the label.

In alternative embodiments of the present invention in which individual labels do not bear a label identifier, the receiving user would otherwise indicate to the relative embodiment, the label(s) on which to print the generic value-bearing item indicia. For example, in an interactive user interface display of a sheet of labels, the user would "click" (by placing the receiving user's online cursor on) the label(s) on which generic value-bearing item indicia is to be printed.

Various embodiments of the present invention would receive the receiving user's input, or indication, of the unit identifier and the label identifier. Various embodiments would use the unit identifier to determine the indication of media type of the unit of labels and the indication of the orientation of the labels with respect to the unit of labels.

Various embodiments of the present invention would be programmed to generate generic postage indicia according to the amount of postage indicated by the receiving user. Various embodiments of the present invention would be further programmed to format the generic postage indicia for printing by a print-rendering device in communication with the user's client computer; the generic postage indicia would be formatted according to the media type of the unit of labels and according to the orientation of the labels with respect to the unit of labels.

Various embodiments of the present invention would provide a method for selecting a format for which to generate postage indicia, said method comprising: displaying to a display device in communication with a computer device, an input field for inputting a control number input; receiving from a user, via the computer device, the control number input, wherein the control number input comprises a format identifier that corresponds to a particular type of label stock, wherein the format identifier comprises a plurality of characters, wherein a subset of characters of the plurality of characters that comprise the format identifier comprises a media type format identifier and a postage indicia orientation format identifier, and wherein a particular unit of the particular type of label stock comprises a plurality of labels; identifying a set of postage indicia format information corresponding to the media type format identifier and the postage indicia orientation format identifier, for formatting at least one postage label, wherein the set of postage indicia format information comprises the orientation indicator, and at least one of: a label size, a set of label dimensions, or a set of label configuration information; and calculating, according to the set of postage indicia format information, at least one of: a printable size of a postage indicia for printing on an at least one label on the particular unit of label stock, or a print location of the postage indicia for printing on the at least one label on the particular unit of label stock.

Various embodiments of the present invention would provide a method for identifying to a system, a format for generating a postage indicia, said method comprising: displaying on a particular unit of label stock, a identifier, wherein the format identifier comprises a plurality of characters, wherein a subset of characters of the plurality of characters that comprise the format identifier comprises an indication of a media type format identifier and of a postage indicia orientation format identifier, wherein the media type format identifier corresponds to a particular media type, wherein the postage indicia orientation format identifier corresponds to a particular postage indicia orientation format, and wherein the particular media type corresponds to a set of media type information; identifying the set of media type information that corresponds to the media type format identifier; identifying the particular postage indicia orientation format that corresponds to the postage indicia orientation format identifier; and responding to an input by a user, via a computer device, of at least the format identifier and an amount of postage, by generating a printable format of at least one postage indicia for printing on an at least one label of the label stock, wherein the printable format of the at least one postage indicia is generated in a format according to the set of media type information that corresponds to the media type format identifier, and according to the particular postage indicia orientation format that corresponds to the postage indicia orientation format identifier.

Various embodiments of the present invention would provide a method for identifying to a computer-based value-bearing item indicia system, a format for generating a value-bearing item indicia, said method comprising: A) displaying on a particular unit of label stock that comprises a plurality of same-sized labels, a format identifier that corresponds to a format of each label of the plurality of same-sized labels, wherein the format identifier comprises an indication of a media type format, wherein the media type format corresponds to a particular media type, and wherein the particular media type corresponds to a set of media type information; B) receiving via a computer device, an input by a user comprising an indication of an amount of value for generating value-bearing item indicia, and the format identifier; C) determining the set of media type information that corresponds to the format identifier; and D) in response to the input by the user of the amount of value for generating value-bearing item indicia, and the format identifier, generating a printable format of at least one value-bearing item indicia for printing on an at least one label of the label stock, wherein the printable format of the at least one value-bearing item indicia is generated in a format according to the set of media type information.

Various embodiments of the present invention would provide a unit of label stock, said unit of label stock comprising:

a plurality of die-cut labels, wherein each label comprises a user-selected, user-manipulated image, and wherein each label further comprises an area adapted for receiving printing of value-bearing item indicia; and a unit identifier that comprises an indication of a media type and further comprises an indication of a postage indicia orientation.

Various embodiments of the present invention would provide a method for printing labels adapted for receiving value-bearing item indicia, said method comprising: receiving from a user a selection of a graphic image to be displayed on a plurality of labels; receiving from the user an indication of an orientation of value-bearing item indicia for printing on the plurality of labels; rendering on a unit of label stock an image of a unit identifier, wherein the unit identifier comprises an indication of a media type of labels; rendering on the unit of label stock a plurality of displays of the graphic image; and kiss-cutting a respective label perimeter corresponding to each display of the graphic image, wherein the respective label perimeter corresponds to the media type.

BRIEF DESCRIPTION OF THE DRAWINGS

These and other features, aspects, and advantages of the present invention will become better understood with regard to the following description, appended claims, and accompanying drawings in which:

FIG. 2C is a graphic representation of an exemplary user interface Customize Your Design screen that would be generated by the exemplary embodiment of the present invention for a user-selected orientation of a portrait orientation;

FIG. 13 is a chart depicting various scaling of human-readable postage indicia in the exemplary embodiment of the present invention;

DETAILED DESCRIPTION OF THE INVENTION

It will be understood by someone with ordinary skill in the art that although the exemplary embodiment of the present invention is described with respect to providing image-customized labels adapted for receiving USPS-approved, image-customized computer-based IBIP generic postage labels, the invention would apply equally to image-customization of labels adapted for receiving other types of VBI.

It will be understood by someone with ordinary skill in the art that "IBIP" is an acronym for the "Information Based Indicia Program" provided by the United States Postal Service ("USPS"). The IBIP facilitates remote user-printing of computer-based Postage, also sometimes referred to as PC-based (Personal Computer based; also sometimes referred to herein as PC Postage), or Internet-based, Postage. In a typical Internet-based postage system, a user can purchase postage credit, and print the postage in the form of PC Postage onto a label or directly onto a mail piece at a printer connected to the user's own computer (that is remote to the Internet-based postage system).

It will be understood by someone with ordinary skill in the art that there are different types of IBIP postage. One type of IBIP postage is recipient-address specific and is date sensitive/date specific. Another type of IBIP postage is "generic" in that it is neither recipient-address specific nor date sensitive/date specific.

The terms "generic postage," "generic Internet postage", "computer-based generic IBIP postage", "computer-based, generic postage indicia", and "computer-based postage" may be used synonymously and/or interchangeably herein to refer to postage that is non-recipient specific and/or non-date specific.

Figure 1:
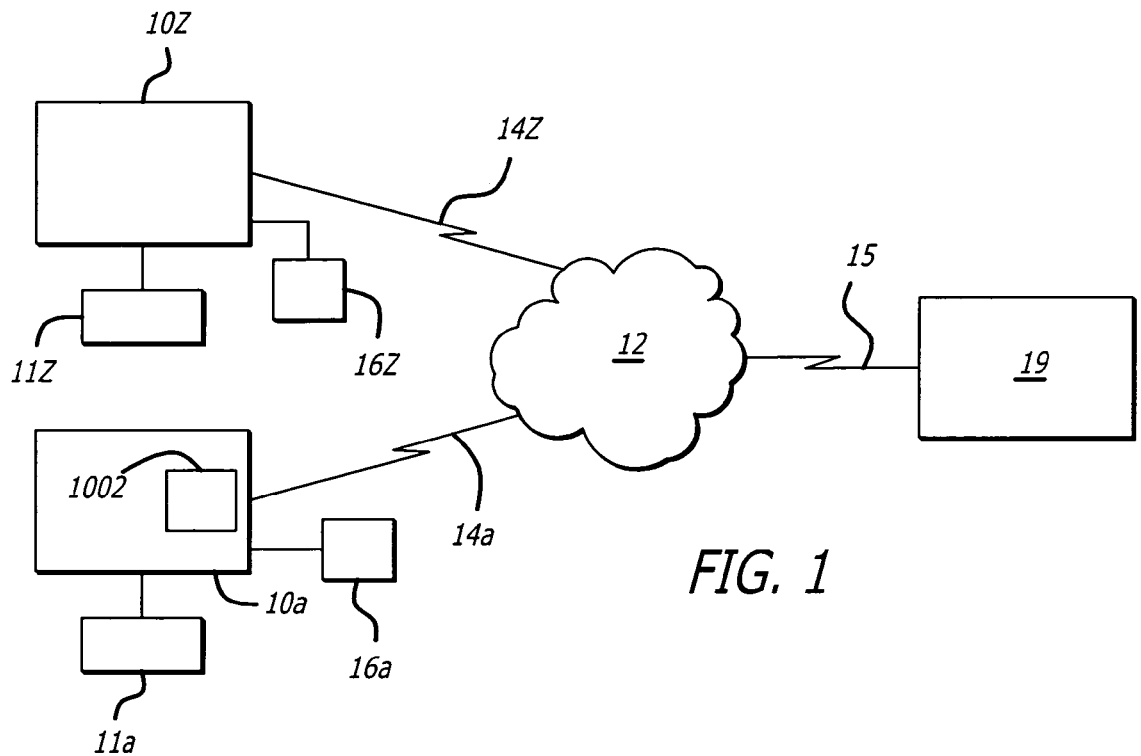
FIG. 1 is a block diagram depicting an exemplary Internet user client/server environment for the exemplary image-customizing label computer system in an exemplary embodiment of the present Invention.

FIG. 1 is a block diagram depicting an exemplary Internet user client/server environment for the exemplary image-customizing label computer system in an exemplary embodiment of the present Invention. It will be understood by someone with ordinary skill in the art that although the exemplary embodiment of the present invention is described in the context of an Internet-based embodiment, that the present invention is not limited to Internet-based applications.

It will be further understood by someone with ordinary skill in the art that many of the functions described herein could alternatively be performed by client software, web-based client software, or server software. The print rendering of the image-customized labels is contemplated as being performed in the exemplary embodiment at a centralized printer. However, it would be possible in alternative embodiments to facilitate polychromatic printing of image-customized labels at user-client-controlled printers without departing from the spirit of the present invention.

With reference to FIG. 1, user client devices $10a$-$10z$ (sometimes referred to herein simply as "client", "clients" or "client computers") and a label customization website 19 will engage in two-way communication via a communication network 12.

In the exemplary embodiment, communication network 12 will comprise the Internet. However, it will be understood by those skilled in the art that the communication network may take many different forms, such as a local area network (LAN), wide area network (WAN), wired telephone network, wireless network, or any other network that supports data communication between respective entities.

Clients $10a$-$10z$ may embody one of a variety of different forms. In one illustrative embodiment, one or more of Clients $10a$-$10z$ may comprise personal computers; other of Clients $10a$-$10z$ may comprise computers or any other device, whether now known or in the future discovered, that has processing capabilities and that may engage in communication over a communications network such as communication network 12.

Each respective client device $10a$-$10z$ will be in communication with a respective display device $11a$-$11z$. Each respective display device, e.g., in the example using client $10a$, display device $11a$, will be integral to, or connected to, or otherwise in communications with, the respective client device, e.g., $10a$.

Clients $10a$-$10z$ will be in communications with the communication network 12 through communication links $14a$-$14z$. A communication link e.g., $14a$, could comprise a wireless communication, a dedicated line connection, cable communication, satellite communication, telephone communication, or any other type of communication now known or in the future discovered. In addition, each client, e.g., client $10a$, may have access to a printer, such as, for example, printer $16a$. Optionally, a local network may serve as the connection between some of the clients and the Internet 12.

The label customization website 19 will also be in communication with the Internet via one or more communication links, e.g., 15. As with communication links $14a$-$14z$ between the client devices $10a$-$10z$ respectively, communication links, e.g., 15, between the label customization website 19 and the Internet could comprise a wireless communication, a dedicated line connection, cable communication, satellite communication, telephone communication, or any other type of communication now known or in the future discovered.

A web browser 1002, such as, for example, NETSCAPE NAVIGATOR®, FIREFOX® 2 by MOZILLA, or MICROSOFT INTERNET EXPLORER®, or some other web browser software or software enabled to retrieve and render hyper-media whether now known or in the future discovered, will be installed on each client device, e.g. $10a$.

Reference herein to web browser 1002 should not be read as referring to any particular web browser brand. Further, reference to a web browser 1002 should not be read as implying that every client computer, e.g., $10a$ through $10z$, all use the same web browser. Rather, each client computer $10a$ through $10z$ will have one web browser that could be selected from various web browsers, whether now known or in the future discovered, with which to control communications between the respective client device, e.g., $10a$, and the Internet.

Further, it will be understood by someone with ordinary skill in the art that the invention will apply to any computer program or set of computer instructions, whether a web browser or some other software now known or in the future discovered, that is adapted to allow a user to retrieve and render hyper-media content from one or more server computers available for communication via a communications network, such as the Internet.

It should be noted that the use of suffixes such as "a" through "z" in connection with numbered elements of the FIGURES herein are exemplary and are not a limitation of the invention to any particular number. Rather, the suffixes "a" through "z", and similar notations, are used herein to an unknown number of similar elements; although the number is unknown, the "a" through "z" suffix notation is used to express a representation of 1 to many.

Communications between a client computer, e.g., $10a$, and the label customization website 19 will be provided via secured eCommerce communications, such as through SSL; HTTPS, which stands for "Hypertext Transfer Protocol over Secure Socket Layer", is an acronym that is often used to describe such a secured eCommerce communications. However, it will be understood by someone with ordinary skill in the art that reference to SSL or HTTPS herein is not a limitation of the invention. Rather, other communication protocols, whether now known or in the future discovered, could be used.

SSL stands for "Secure Sockets Layer," a protocol developed by NETSCAPE® for transmitting private documents via the Internet. SSL works by using a private key to encrypt data that is then transferred over the SSL connection. Both NETSCAPE NAVIGATOR® and MICROSOFT INTERNET EXPLORER® web browsers, support SSL; many websites use SSL protocol to protect the exchange of confidential user information, such as credit card numbers.

In the exemplary embodiment, a user will use a client device, e.g., client computer $10a$, to access the label customization website 19 to input an order for image-customized labels.

When a user using a client device, e.g., client computer $10a$, accesses the label customization website 19 to input an order for image-customized labels, the exemplary embodiment of the present invention will comprise generating a display of one or more user interface screens (exemplary embodiments of which are described further below) that are adapted for receiving an order from a user for at least one image-customized label adapted for bearing a computer-based, generic, value-bearing item such as a computer-based, generic postage indicia.

Upon accessing the label customization website 19, an accessing user would input a user-identifier and password, such as on a homepage (not shown). The exemplary embodiment would authenticate the user, or if the user was a new user, would provide a user registration process, which would result in the user indicating a user identifier and a user password.

Once a user has properly registered and signed in, the exemplary embodiment would display certain preliminary user interface screens (not shown), by which the user could, for example, indicate that the user intends to place an order for image-customized postage labels. Once a user has indicated that the user intends to place an order for image-customized postage labels, the exemplary embodiment would present an exemplary user interface screen by which the user could input specification for such an order.

Figure 2A:
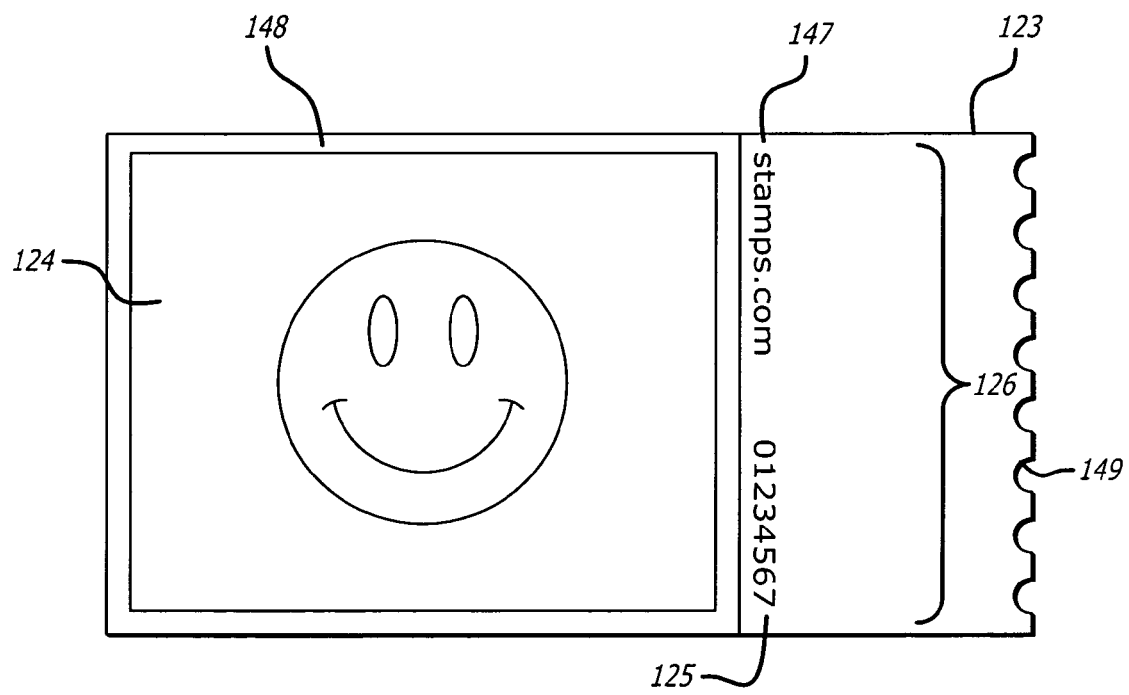
FIG. 2A is a graphic representation depicting an exemplary label that would be printed as a result of an order for image-customized labels in an exemplary embodiment of the present invention.

FIG. 2A is a graphic representation depicting an exemplary label 123 that would be printed as a result of an order for image-customized labels in an exemplary embodiment of the present invention.

The exemplary label 123 features a distinctly-dimensioned "footprint"—that is, a physical label corresponding to exemplary label 123 would have particular dimensions, i.e., a particular height and a particular width.

Disclosure herein of a single label "footprint" is not a limitation of the present invention. Alternative embodiments of the present invention would provide users with an option of choosing one label footprint option from a plurality of label footprint options and would provide the orientation (portrait and landscape, sometimes referred to herein as vertical and horizontal, respectively) options described further below with respect to each label footprint option.

Figure 2B:
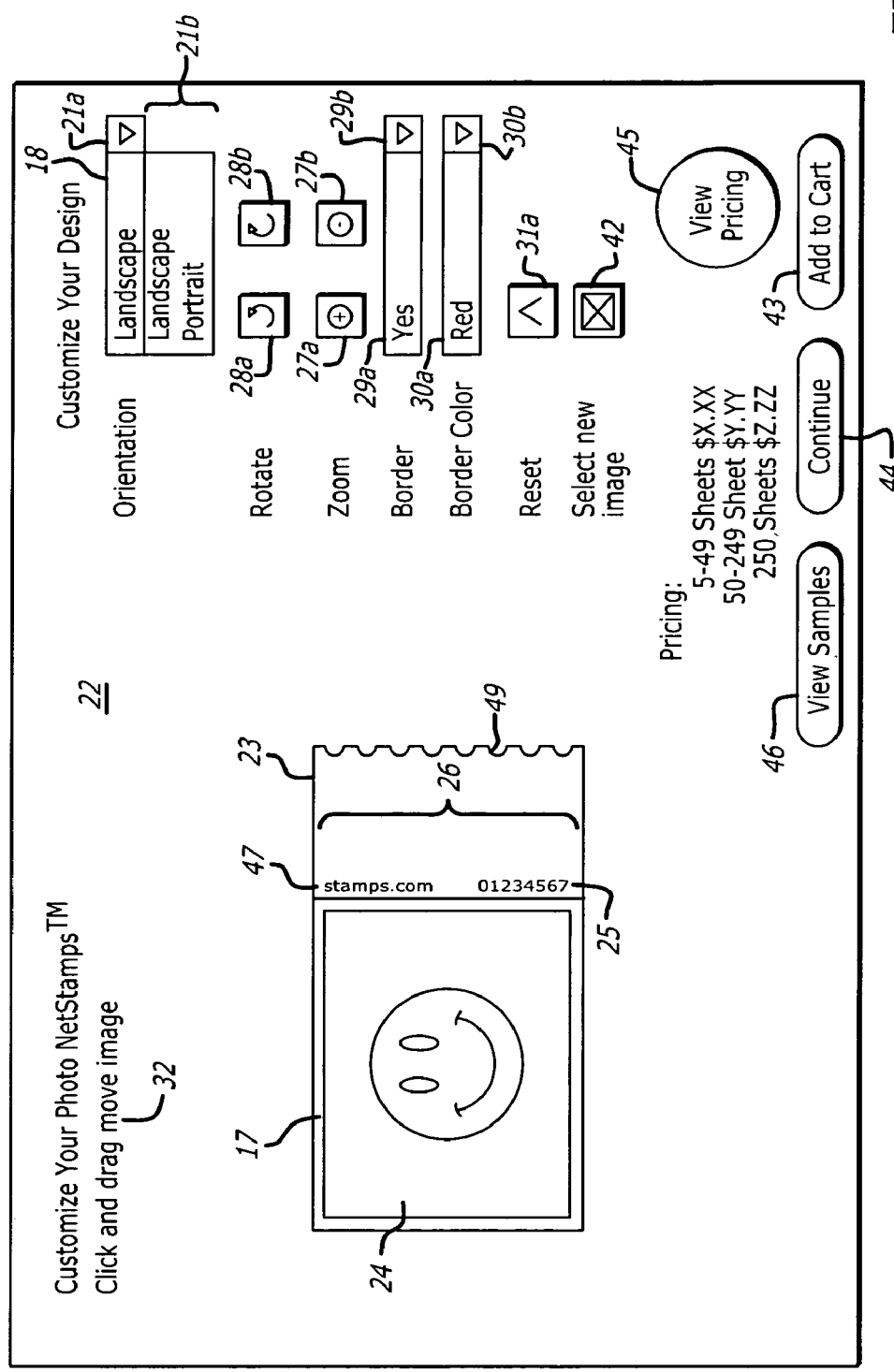
FIG. 2B is a graphic representation of an exemplary user interface Customize Your Design screen that would be generated by the exemplary embodiment of the present invention.

FIG. 2B is a graphic representation of an exemplary user interface Customize Your Design screen 22 that would be generated by the exemplary embodiment of the present invention. With reference to FIG. 2B, in the exemplary embodiment, the exemplary user interface Customize Your Design screen 22 would present an exemplary display of an exemplary image-customized label 23 of the present invention. In FIG. 2B, the exemplary image-customized label 23 is depicted in landscape orientation, sometimes referred to herein as horizontal orientation.

As depicted in FIG. 2B, the exemplary user interface Customize Your Design screen 22 would provide an exemplary orientation input field 18. An exemplary orientation pull-down menu button 21*a* would also be provided. If a user clicked on the exemplary orientation pull-down menu button 21*a*, an exemplary orientation pull-down menu 21*b* would be displayed. The exemplary orientation pull-down menu 21*b* would provide a landscape orientation option 21*b*-1 and a portrait orientation option 21*b*-2. If a user selected the landscape orientation option 21*b*-1, then the exemplary image-customized label 23 would be displayed in landscape orientation as depicted in FIG. 2B.

If a user selected the portrait orientation option 21*b*-2, then the exemplary image-customized label 23 would be displayed in portrait orientation. FIG. 2C is a graphic representation of an exemplary user interface Customize Your Design screen 22 that would be generated by the exemplary embodiment of the present invention for a user-selected orientation of a portrait orientation.

With reference to FIGS. 2B and 2C, the exemplary display of an exemplary image-customized postage label 23 will bear an image (landscape-oriented image element 24 in FIG. 2B and portrait-oriented image element 24' in FIG. 2C) that would be provided by a corresponding user when placing an order for image-customized labels. The exemplary display of an exemplary image-customized postage label 23 will also provide an exemplary blank area 26.

With reference to FIGS. 2B and 2C, exemplary blank area 26 depicts a blank area (e.g., element 126 depicted on FIG. 2A) that would be provided on a physical image-customized label (e.g., element 123 depicted on FIG. 2A) that would be printed (or otherwise produced) as a result of an order for image-customized labels. In the exemplary embodiment, the blank area 26 (and the blank area 126 on the physical image-customized label) would be adapted for receiving (and bearing) a computer-based, generic, postage indicia subsequent to a user receiving the image-customized labels and requesting postage In the exemplary embodiment of the present invention, image-customized labels would be produced based on a particular user's order but would not bear any postage indicia; the postage indicia would be applied by a user's client computer printer at a time subsequent to production of the image-customized labels and receipt by the user of the image-customized labels. Generation of postage indicia for printing on a client printer by a user's client computer will be described further below. As will also be discussed further below, formatting of the computer-based, generic postage indicia for a particular label will depend on the footprint of the particular label and the orientation of the label as defined by the ordering user.

In the exemplary embodiment, exemplary blank area 26 would be located to the right of the image 24 for a landscape-oriented label such as the landscape-oriented label 23 depicted in FIG. 2B. In the exemplary embodiment, exemplary blank area 26 would be located to the top of the image 24' for a portrait-oriented label such as the portrait-oriented label 23 depicted in FIG. 2C.

The description herein of the exemplary blank area 26 location to the right of the image 24 in a landscape-oriented label, and to the top of the image 24' in a portrait-oriented label is exemplary and is not a limitation of the present invention. As previously mentioned above, alternative embodiments of the present invention would provide users with the option of selecting from various label "footprint" alternatives—each footprint would have different dimensions. Therefore, a blank area for a respective label footprint could be sized and located differently according to the dimensions of the respective label footprint alternative.

With reference to FIGS. 2B and 2C, the exemplary display of an exemplary image-customized postage label 23 will also provide an exemplary display of a mock serial number 25. The exemplary display of an exemplary image-customized postage label 23 will also provide an exemplary provider name identifier 47. The exemplary provider name identifier 47 would represent the name of the entity that would produce the image-customized label in response to a user's order.

In the exemplary embodiment, the exemplary display of a mock serial number 25 would be provided to show eventual placement on a physical image-customized label of an actual serial number (see, e.g., exemplary serial number 125 on FIG. 2A) that will be generated once an order has been placed for printing on the physical image-customized label.

It will be understood by someone with ordinary skill in the art that the description of the exemplary embodiment displaying a mock serial number on the exemplary display of an image-customized postage label is exemplary and illustrative. It will be understood by someone with ordinary skill in the art that displaying a serial number on a label is one way of providing security against fraudulent or unauthorized production of value-bearing item indicia labels or labels adapted for receiving generic value-bearing item indicia. It will be understood by someone with ordinary skill in the art that displaying a serial number on value-bearing item indicia labels or labels adapted for receiving generic value-bearing item indicia is only one of many ways in which to provide security against fraudulent or unauthorized production or use of such labels. In embodiments in which serial numbers would not be displayed on value-bearing item indicia labels or labels adapted for receiving generic value-bearing item indicia, then no mock serial number would be displayed in a display of an image-customized label.

With reference to FIG. 2B, in the exemplary embodiment, if the user had not already indicated an image to be used, then image 24 would be blank. In order to facilitate selecting an image, indicating a new image, or if the user has not yet input an image, inputting an image, the exemplary user interface Customize Your Design screen 22 will provide an option, such as, for example, an exemplary online Select New Image button 42, by which the user would navigate to a means for uploading one or more images and/or selecting an image for use in placing an order.

If a user clicks on the exemplary online Select New Image button 42, the exemplary embodiment would present a user interface display of the images that the user had previously uploaded.

Figure 3:
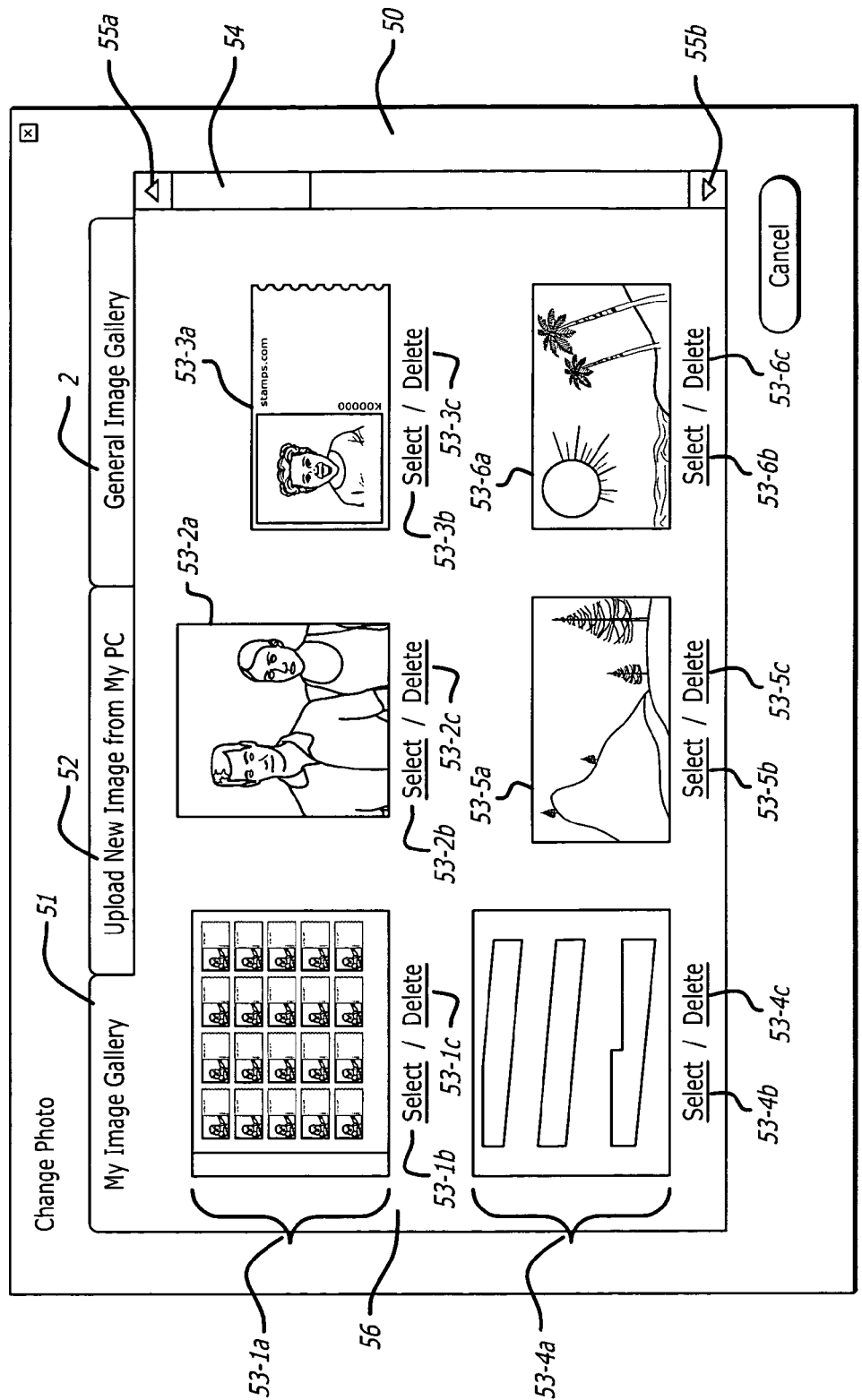
FIG. 3 is a graphic representation depicting an exemplary user "Change Photo" interface display in an exemplary embodiment of the present invention.

FIG. 3 is a graphic representation depicting an exemplary user "Change Photo" interface display 50.

It will be understood by someone with ordinary skill in the art that the exemplary graphic user interface screens depicted herein with respect to a description of the exemplary embodiment of the present invention are illustrative and non-limiting; that various alternative means for interacting with a user could be provided without departing from the spirit of the present invention. For example, it will be understood by someone with ordinary skill in the art that various ways could be used to prompt a user to select an image previously provided or uploaded by the user, or, if the user had not previously uploaded images, to prompt the user to upload an image, or to prompt the user to select an existing image from a general gallery.

Returning with reference to FIG. 3, the exemplary user interface "Change Photo" display 50 would provide three exemplary options: a "My Image Gallery" option 51, an "Upload New Image from My PC" option 52, and a "General Image Gallery" option 2.

If the "General Image Gallery" option 2 is selected or otherwise displayed, a user interface featuring a collection of images would be presented in a manner similar to that described below with respect to the exemplary user interface "My Image Gallery" option display 54. The difference between the "General Image Gallery" collection of images and the images displayed in the exemplary user interface "My Image Gallery" option display 54 would be that the images that would be displayed in the "General Image Gallery" collection would be images that would have been provided by the system provider and would be available for use by all users of the system; the images that would be displayed in the exemplary user interface "My Image Gallery" option display 54 would be images that would have been uploaded by the particular user and would be accessible by the particular user but would not be accessible by other users unless the other users had similarly uploaded the same image(s).

The user interface for the "General Image Gallery" option 2 would provide the viewing user with an option to select any of the images displayed. The exemplary embodiment would not provide options to the user for deleting images from the "General Image Gallery" display. In alternative embodiments, the user would be provided with an option to customize the user's view of the "General Image Gallery" display by marking images that the user was not interested in as "deleted." On user deleting an image from that user's view of the "General Image Gallery" would not effect the view of any other user of the images in the "General Image Gallery."

If the "My Image Gallery" option 51 is selected or otherwise displayed, an exemplary user interface "My Image Gallery" option display 56 would be presented that would display all of the exemplary images 53-1a, 53-2a, 53-3a, 53-4a, 53-5a, and 53-6a, that the user has previously uploaded. If the user has uploaded more images than can be displayed at once, the exemplary user interface "My Image Gallery" option display 56 would provide an online sliding key 54, and up 55a and down 55b buttons, that the user would be able to use to advance though all of the images that the user had previously uploaded.

For each image, e.g., 53-1a, 53-2a, 53-3a, 53-4a, 53-5a, and 53-6a, that the user had previously uploaded, a "Select" and "Delete" option, e.g., 53-1b and c, 53-2b and c, 53-3b and c, 53-4b and c, 53-5b and c, and 53-6b and c, respectively, would be provided.

If, for a particular image, e.g., 53-11a, the user clicked the corresponding "Delete" option, e.g., 53-1c, the exemplary embodiment of the present invention would delete the image from the collection of images associated with the user and would delete the image from the images database of the exemplary embodiment; the deleted image would no longer be displayed in the exemplary user interface "My Image Gallery" option display 56.

If, for a particular image, e.g., 53-1a, instead of clicking the "Delete" option, e.g., 53-1c, the user clicked the corresponding "Select" option, e.g., 53-1b, the exemplary embodiment of the present invention would return to a display of the exemplary user interface Customize Your Design screen 22 as depicted in FIGS. 2B and 2C, and would present the image, e.g., 53-1a that corresponded to the clicked "Select" option, e.g., 53-1b, as the image 24 and 24' in FIGS. 2B and 2C respectively depicted in the exemplary image-customized postage label 23.

Before continuing with further description of the exemplary user interface Exemplary Application display 22 depicted in FIGS. 2B and 2C, if the user had not previously uploaded any images, then the exemplary user interface "My Image Gallery" option display 56 depicted in FIG. 3 would be blank; the user would be able to click on the exemplary "Upload New Image from My PC" option 52 to upload an image.

Figures 4, 5:
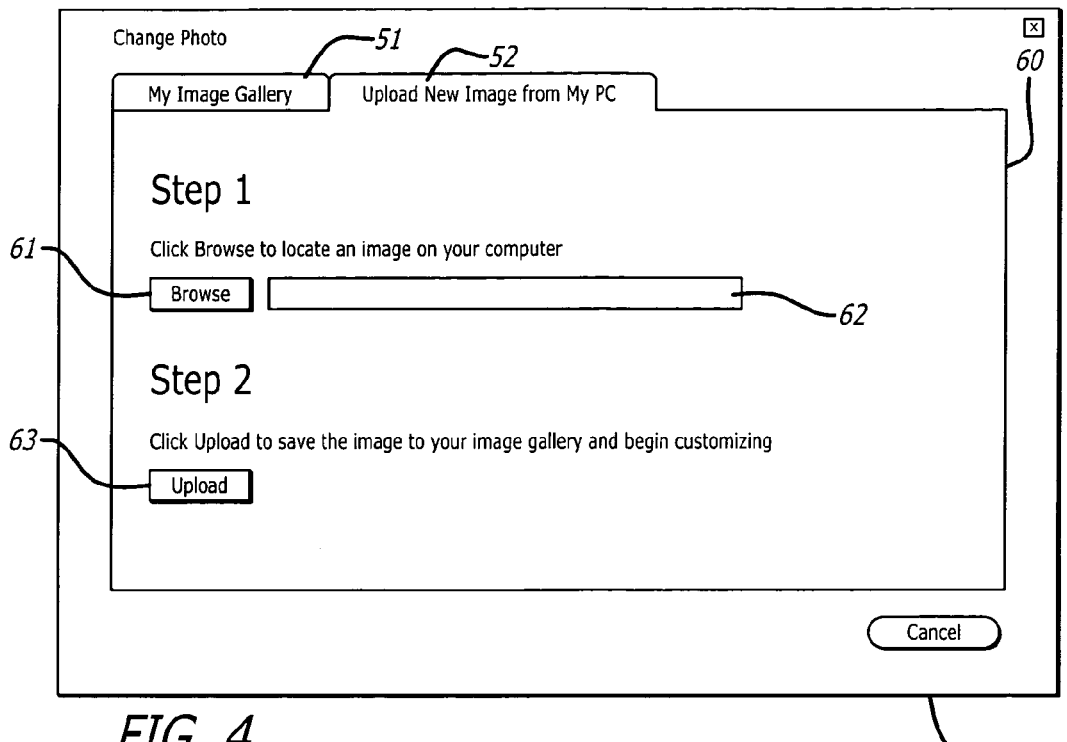
FIG. 4 is a graphic representation of an exemplary "Upload New Image From My PC" interface display in an exemplary embodiment of the present invention.
FIG. 5 is a graphic representation of an exemplary "Order Completion" interface display in an exemplary embodiment of the present invention.

Whether or not the user had previously uploaded images, the exemplary embodiment would provide the exemplary "Upload New Image from My PC" option 52 depicted in FIG. 3. If the user clicked on the exemplary "Upload New Image from My PC" option 52, the exemplary embodiment of the present invention would present an exemplary user interface "Upload New Image from My PC" option display 60 as depicted in FIG. 4.

The exemplary user interface "Upload New Image from My PC" option display 60 would provide a "Browse" button 61, and an image location input field 62. A user would be able to click on the "Browse" button 61 to browse and identify locations at which an image may be located for uploading. Alternatively, the user could key in a location at which an image to be uploaded into image location input field 62. Once a location is identified in the image location input field 62, the user could then click the "Upload" button 63.

Once a location is identified in the image location input field 62, if the user clicks the "Upload" button 63, the exemplary embodiment would upload an electronic copy, such as, for example, a digital copy, of the image from the location identified in the image location input field 62; the exemplary embodiment would save the uploaded electronic copy of the image into an image database accessible by the exemplary embodiment; and the exemplary embodiment would save an indication of a user identifier with the electronic copy of the image saved in the image database.

It will be understood by someone with ordinary skill in the art that the above-described means for uploading and saving an electronic copy of images is exemplary and that alternative means for obtaining images with which to complete image-customization orders would be possible without departing from the spirit of the present invention. For example, instead of uploading an electronic copy of an image at the time that the user identifies a location of the image, an alternative embodiment of the present invention could save an address or other location identifier for the image with an identifier for the user in a database; an electronic copy of the image could be uploaded if and when the user selected the image for a particular order.

Returning with reference to the exemplary embodiment, once an electronic copy of an image has been uploaded and saved along with the identifier corresponding to the uploading user in the image database, the exemplary embodiment would return control to the exemplary user interface "Upload New Image from My PC" option display 60. The user could then browse and upload additional images, or could click the exemplary "My Image Gallery" option 51 to return to the exemplary user interface "My Image Gallery" option display 56 depicted in FIG. 3.

Returning to the exemplary user interface "My Image Gallery" option display 56 depicted in FIG. 3, the user could then click the "Select" option, e.g., "Select" 53-1b, corresponding to one of the images, e.g., image 53-1a, depicted in the exemplary user interface "My Image Gallery" option display 56. The exemplary embodiment of the present invention would then return to a display of the exemplary user interface Customize Your Design screen 22 as depicted in FIGS. 2B and 2C, and would present the image selected by the user from the exemplary user interface "My Image Gallery" option display 56 depicted in FIG. 3, e.g., 53-1a, that corresponded to the clicked "Select" option, e.g., 53-1b; the selected image would be displayed as the image 24 in FIG. 2A depicted in the exemplary image-customized postage label 23.

Continuing with reference to FIGS. 2B and 2C, once a user had selected an image 24 or 24' respectively for an order, the exemplary embodiment would provide various online options for manipulating the image for the order.

For example, the exemplary embodiment would provide exemplary image zoom options, such as, for example, an exemplary zoom-in (magnify; "+") option 27a, and an exemplary zoom-out (reduce; "−") option 27b. If a user clicked on the exemplary zoom-in option 27a, the exemplary embodiment would present a magnification of the image 24 (or element 24' in FIG. 2C) in the exemplary display of the exemplary image-customized label 23. If the user clicked on the exemplary zoom-out option 27b, the exemplary embodiment would present a reduced-size of the image 24 (or element 24' in FIG. 2C) in the exemplary display of the exemplary image-customized label 23.

The exemplary embodiment would provide exemplary image rotate options, such as, for example, an exemplary rotate counterclockwise option 28a and an exemplary rotate clockwise option 28b. If a user clicked on the exemplary rotate counterclockwise option 28a, the exemplary embodiment would present a counterclockwise rotation of the image 24 (or element 24' in FIG. 2C) in the exemplary display of the exemplary image-customized label 23. If the user clicked on the exemplary rotate clockwise option 28b, the exemplary embodiment would present a clockwise rotation of the image 24 (or element 24' in FIG. 2C) in the exemplary display of the exemplary image-customized label 23.

The exemplary embodiment would provide an exemplary border indication options, such as, for example, an exemplary border option pull-down menu button 29b that would allow a user to select a display border option. If a user clicked the exemplary border option pull-down menu button 29b, an exemplary pull-down menu of display border options (not shown) would be displayed over the border option field 29a, from which the user could select, such as by clicking, highlighting, or other means, a particular border graphic option. The selected border option would appear in the display border option field 29a and would be used by the exemplary embodiment to present a border graphic (a graphic "frame") around the image 24 (or element 24' in FIG. 2C). Because the border option "none" is indicated in FIG. 2A, the exemplary image-customized label 23 depicted in FIG. 2A does not depict any border around exemplary image 24 (or element 24' in FIG. 2C). Exemplary border options, other than "none" could include, for example, a list of border graphics, such as solid, cross-hatching and the like.

The exemplary embodiment would provide exemplary border color selection options, such as, for example, a border color pull-down menu button 30b and a border color indication field 30a. If a user clicked the exemplary border color pull-down menu button 30b, an exemplary pull-down menu of border color options (not shown) would be displayed over the color indication field 30a, from which the user could select, such as by clicking, highlighting, or other means, a particular border color option. The selected border color option would appear in the display border option field 29a and would be used by the exemplary embodiment to present a border color of the corresponding border graphic around the image 24 (or element 24' in FIG. 2C).

The exemplary embodiment would provide an exemplary reset options, such as, for example, "reset" button 31a. Clicking the exemplary "reset" button 31a in the exemplary embodiment would reset the image 24 (or element 24' in FIG. 2C) to the original uploaded image selected by the user from the exemplary user interface "My Image Gallery" option display 56 depicted in FIG. 3, e.g., 53-1a, that corresponded to the clicked "Select" option, e.g., 53-1b. In alternative embodiments, clicking a "reset" button 31a could successively reset the displayed image 24 (or element 24' in FIG. 2C) to a prior set of manipulation options.

The exemplary embodiment would provide a "click and drag to move image" feature 32 that would allow the user to click on the image 24 (or element 24' in FIG. 2C) and drag it up, down, left or right to reposition the image 24 (or element 24' in FIG. 2C) on the exemplary image-customized label 23. In the exemplary embodiment, use of the "click and drag" feature 32 would have the effect of cropping the image.

Once a user is satisfied with the image 24 (or element 24' in FIG. 2C), the user could click the "View Pricing" option 45 to view prices for ordering certain quantities of the exemplary image-customized label 23 depicted in FIGS. 2B and 2C. The user could also click the "View Samples" option 46 to view samples of sheets, (or rolls) of the exemplary image-customized label 23 depicted in FIGS. 2B and 2C. The user could also click the "Add to Cart" button 43 to cause the specifications for the exemplary image-customized label 23 to be saved to the user's "Cart" for later completion of the order. Alternatively, the user could click the "Continue" option 44 to navigate to an exemplary user interface Order Completion display. FIG. 5 is a graphic representation depicting an exemplary user interface Order Completion display 70 in the exemplary embodiment of the present invention. In the exemplary embodiment, the exemplary user interface Order Completion display 70 would provide a sheet order indicator 71 which a user would check (by clicking) to indicate that image-customized labels would be ordered in sheets. If a user indicated that sheets of labels would be ordered by checking sheet order indicator 71, then the user would also complete an exemplary number of sheets input field 72, either by inputting a number, or, alternatively, by clicking on an exemplary number of sheets pull-down menu button 73. If the user clicked on the exemplary number of sheets pull-down menu button 73, a pull down menu (not shown) of numbers of sheets would appear over the exemplary number of sheets input field 72; the user would click one of the numbers of sheets selections in the pull-down menu of numbers of sheets to select a number of sheets to be input in exemplary number of sheets input field 72 and ordered.

In the exemplary embodiment, the exemplary user interface Order Completion display 70 would further provide an exemplary roll order indicator 74 which a user would check (by clicking) to indicate that image-customized labels would be ordered in rolls. If the user indicated that rolls of image-customized labels would be ordered by checking the exemplary roll order indicator 74, then the user would need to identify the number of labels per roll in the exemplary labels per roll input field 75. In the exemplary embodiment, an exemplary number of labels per roll pull-down menu button 76 would be provided. In order to identify a number of labels per roll to be ordered, a user would click the exemplary number of labels per roll pull-down menu button 76, which would cause an exemplary number of labels per roll pull-down menu (not shown) to be displayed over the exemplary labels per roll input field 75. Once the exemplary number of labels per roll pull-down menu (not shown) was displayed, the user would click one of the exemplary number of labels per roll selections listed in the exemplary pull-down menu to select a number of labels per roll to be input in the exemplary labels per roll input field 75 and ordered.

In the exemplary embodiment, the exemplary user interface Order Completion display 70 would further provide an exemplary number of rolls input field 77 and exemplary number of rolls pull-down menu button 78. In the exemplary embodiment, if the user had indicated that rolls of image-customized labels would be ordered by checking the exemplary roll order indicator 74, then the user would also need to identify the number of rolls to be ordered. In the exemplary embodiment, a user could identify the number of rolls to be ordered by entering a number in the exemplary number of rolls input field 77. Alternatively, a user could identify the number of rolls to be ordered by clicking on the exemplary number of rolls pull-down menu button 78 and making a selection from an exemplary number of rolls pull-down menu (not shown) that would be displayed over exemplary number of rolls input filed 77.

In the exemplary embodiment, the exemplary user interface Order Completion display 70 would further provide an exemplary Credit Card pull-down menu button 80 and an exemplary Credit Card input field 79. A user could input the type of credit card (e.g., Master Card, VISA, Discover, American Express, etc.) into the exemplary Credit Card input field 79 by clicking on the exemplary Credit Card pull-down menu button 80, which would cause an exemplary Credit Card type pull-down menu (not shown) to be displayed over the exemplary Credit Card input field 79. The user could identify the Credit Card type by clicking on one of the credit card types listed in the exemplary Credit Card type pull-down menu (not shown), which would cause the selected credit card type to be input into the exemplary Credit Card input field 79.

In the exemplary embodiment, the exemplary user interface Order Completion display 70 would further provide an exemplary Credit Card Number input field 81 into which a user would input the credit card number to be billed for the order.

In the exemplary embodiment, the exemplary user interface Order Completion display 70 would also provide an exemplary Shipping Address input field for completion by the user if the Shipping Address would be different than the user's address.

In the exemplary embodiment, the exemplary user interface Order Completion display 70 would further provide an exemplary Return button 82 (to be clicked to return to the previous screen), an exemplary Submit button 83 (to be clicked to submit the order), and an exemplary Cancel button 84 (to be clicked to cancel the order).

Once a user has completed the exemplary user interface Order Completion display 70 input fields and clicked the Submit button 83, then the order would be submitted and the exemplary embodiment of the present invention would receive the order.

It will be understood that the exemplary embodiment is described herein as facilitating one image per order. That is, a single image would be used to produce an order, whether on sheets or rolls, of image-customized labels. It will be further understood that the description herein of the single-image-per-order exemplary embodiment is illustrative and is not a limitation of the invention. For example, in an alternative exemplary embodiment, a single order could comprise a plurality of images.

Figure 6:
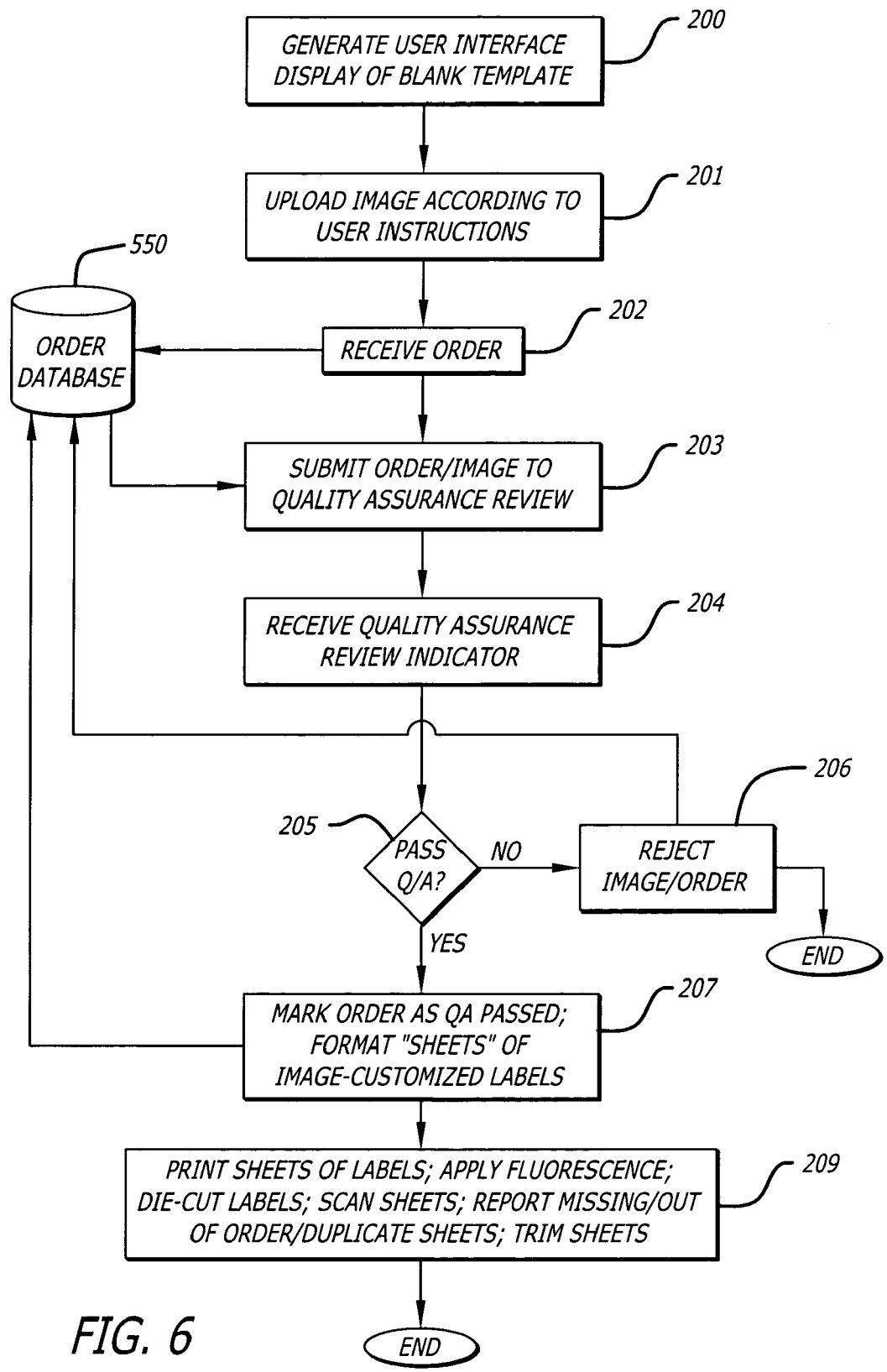
FIG. 6 is a high-level flow diagram depicting exemplary high-level logic functions in an exemplary embodiment of the present invention.

FIG. 6 is a high-level flow diagram depicting exemplary high-level logic functions in an exemplary embodiment of the present invention, including the processes described above. In summary, the exemplary embodiment will generate in process 200 a user interface display of a blank label template as described above, with respect to exemplary user interface Customize Your Design screens 22 as depicted in FIGS. 2B and 2C. The exemplary embodiment will upload in process 201 an image according to user instructions as described above with respect to FIGS. 3 and 4.

In the exemplary embodiment, once an order is submitted by a user, the exemplary embodiment will receive the order as depicted in process 202 in FIG. 6. The exemplary embodiment will then assign the order an order identifier (sometimes referred to herein as an "Order ID"), and will save the order on an order database (see, e.g., element 550 on FIG. 6). The order will then be queued for presentation to pre-print Quality Assurance (see function 203 depicted in FIG. 6). In the exemplary embodiment of the present invention, the order will be assigned an order number and the order will be queued for presentation to pre-print Quality Assurance in much the same way as is disclosed in U.S. patent application Entitled: "IMAGE-CUSTOMIZATION OF COMPUTER-BASED VALUE-BEARING ITEMS"; application Ser. No. 10/994,698, filed on Nov. 22, 2004 (the entire contents and disclosure of which is hereby incorporated by reference in full herein for all purposes as if fully stated here).

In the exemplary embodiment, an order saved on the order database (see, e.g., element 550 on FIG. 6) comprises, among other things: an identifier of the ordering user; a computer-accessible address of, or other location identifier for, the image originally uploaded by the ordering user; a set of all of the image manipulation (transformation/customization) instructions input by the user to obtain the final image approved by the ordering user as the image to be ordered; label orientation information, comprising, for example, an indication of a portrait orientation of the ordered labels, or an indication of a landscape orientation of the ordered labels; payment information; and recipient shipping information. If the user has not indicated a shipping address (see Shipping Address input field 85 in FIG. 5), then the exemplary embodiment will use the address for the user that is stored in a user database created when the user registers (not shown).

In the exemplary embodiment, the order identifier assigned to an order will be unique. However, it will be understood by someone with ordinary skill in the art that the order identifier could be non-unique in alternative embodiments.

In the exemplary embodiment, once an order has been submitted, the order will be assigned a SKU.

Pre-print Quality Assurance will be managed by the exemplary embodiment of the present invention in much the same way as disclosed in U.S. patent application Entitled: "IMAGE-CUSTOMIZATION OF COMPUTER-BASED VALUE-BEARING ITEMS"; application Ser. No. 10/994, 698, filed on Nov. 22, 2004 (the entire contents and disclosure of which has previously been incorporated by reference in full herein for all purposes). Generally, the exemplary embodiment will queue the ordered image (see process 203 in FIG. 6) for review by one or more pre-print Quality Assurance reviewers/users. When the position of an ordered image in the queue is ready for review, the exemplary embodiment will present the ordered image for review by one or more pre-print Quality Assurance reviewers/users; once the one or more pre-print Quality Assurance reviewers/users have reviewed the ordered image and entered an indication of approval or denial of the image, the exemplary embodiment will receive the indication from the one or more pre-print Quality Assurance reviewers/users of approval or denial of the ordered image (see function 204 depicted in FIG. 6).

If the ordered image does not pass (see function 205 and the "No" path from function 205 depicted in FIG. 6) pre-print Quality Assurance review, the image will be rejected (see function 206 depicted in FIG. 6) and the order will be marked on the order database as rejected (see, e.g. function 206 and element 550 depicted in FIG. 6).

If, on the other hand, the ordered image passes (see function 205 and the "Yes" path from function 205 depicted in FIG. 6) pre-print Quality Assurance review, then the order will be marked on the order database (see, e.g., process 207 on FIG. 6 and element 550 on FIG. 6) as passed and ready for further processing; and further functions will be performed to prepare the order for fulfillment (see function 209 in FIG. 6, regarding printing of labels, etc.).

In the exemplary embodiment of the present invention, the exemplary image-customizing postal label computer system will produce "secured paper" image-customized labels.

In the exemplary embodiment, a control number, herein sometimes referred to as a serial number, would be generated to identify each postage stamp. Each such serial-number-controlled postage label may be referred to herein as a Postagio label. Paper stock, such as label stock, controlled with serial numbers, is sometimes referred to herein as "secured paper." As will be understood by someone with ordinary skill in the art, serial-number-controlled label and paper stock is not limited to Postagio labels. Other non-limiting examples of secured paper controlled using serial numbers include check stock.

It will be understood by someone with ordinary skill in the art that "secured paper" is paper, or in the case of the exemplary embodiment, label stock, that is secured in some manner from fraudulent printing of value-bearing indicia. One way that labels can be secured from fraudulent printing of value-bearing indicia is to assign each label a unique serial number; subsequent processing of value-bearing indicia would require that the indicia provide, for example, in machine-readable, encrypted form, some indication of, or reference of, the unique serial number.

It will be understood by someone with ordinary skill in the art that assigning each label a serial number is not the only way to secure labels from fraudulent printing of value-bearing indicia; other ways are possible. Therefore, it will be understood by someone with ordinary skill in the art that the description herein of assigning a unique serial number to each label is not a limitation of the present invention. Rather, various embodiments of the present invention would use methods other than assigning serial numbers to each label for securing labels from fraudulent or unauthorized printing of value-bearing indicia.

Exemplary systems and methods for producing value-bearing items on secured paper were disclosed, for example, in U.S. patent application Entitled: "IMAGE-CUSTOMIZATION OF COMPUTER-BASED VALUE-BEARING ITEMS"; application Ser. No. 10/994,698, filed on Nov. 22, 2004 (the entire contents and disclosure of which has previously been incorporated by reference in full herein for all purposes).

However, in the aforementioned U.S. patent application Entitled: "IMAGE-CUSTOMIZATION OF COMPUTER-BASED VALUE-BEARING ITEMS" (application Ser. No. 10/994,698), the exemplary value-bearing item indicia comprised not only some indication of, or reference of, a unique serial number, but also comprised an indication of postage, for example, in the form of postage indicia. As compared to labels that comprise an indication of value, such as, for example, an indication of postage, the exemplary image-customized labels produced as secured paper by the exemplary embodiment of the present invention will not comprise any indication of value. That is, the exemplary image-customized labels produced as secured paper by the exemplary embodiment of the present invention will not comprise any indication of postage value.

In the exemplary embodiment of the present invention, the exemplary image-customized labels will be produced as secured paper by virtue of the following: 1.) each unit of labels, such as each sheet of labels, will bear a human-readable unit identifier, such as a sheet identifier; 2.) each label will bear a human-readable, label identifier. In the exemplary embodiment, a combination of the label identifier and the unit identifier will comprise a secure-paper serial number. Further, in the exemplary embodiment, each label will be specially die-cut to include a serrated, or scalloped, edge, such as, for example, scalloped edge 149 as depicted in FIG. 2A. Yet further, in the exemplary embodiment, a pattern of invisible fluorescent ink will be positionally applied on the printed surface of each image-customized postage label on the printed unit of label stock, such as on a sheet of label stock. The exemplary embodiment will be programmed to format the pattern of invisible fluorescent ink for application to each label according to the media type of the label and according to the orientation of the label.

In the exemplary embodiment, unit identifiers, such as sheet identifiers for each sheet, and label identifiers for each label on the respective sheet, will be generated in much the same way as master serial numbers and label serial numbers are generated as disclosed in U.S. patent application Entitled: "IMAGE-CUSTOMIZATION OF COMPUTER-BASED VALUE-BEARING ITEMS"; application Ser. No. 10/994,698, filed on Nov. 22, 2004 (the entire contents and disclosure of which has previously been incorporated by reference in full herein for all purposes). However, in various embodiments of the present invention, unit identifiers (e.g., sheet identifiers for sheets of label stock, or if rolls of labels are ordered, roll identifiers), will be generated to comprise an indication of media type (i.e., sheets or rolls, and label footprint) and label orientation (i.e., portrait or landscape). In other embodiments of the present invention, unit identifiers (e.g., sheet identifiers for sheets of label stock, or if rolls of labels are ordered, roll identifiers), will be generated to comprise an indication of media type (i.e., sheets or rolls, and label footprint), but will not comprise an indication of label orientation (i.e., portrait or landscape).

Returning with reference to FIGS. 2B and 2C, as previously described above, the exemplary user interface Customize Your Design screen 22 would provide an exemplary orientation input field 18. If the user selected the landscape orientation option 21b-1, then the exemplary image-customized label 23 would be displayed in landscape orientation as depicted in FIG. 2B. If the user selected the portrait orientation option 21b-2, then the exemplary image-customized label 23 would be displayed in portrait orientation as depicted in FIG. 2C. FIG. 2C is a graphic representation of an exemplary user interface Customize Your Design screen 22 that would be generated by the exemplary embodiment of the present invention for a user-selected orientation of a portrait orientation.

In the exemplary embodiment, if the user placed an order for labels with portrait orientation, then the exemplary embodiment would be programmed to recognize the user indication of a portrait orientation of the labels for an order and would be programmed to assign each unit identifier for each unit of the order to comprise an indication of a portrait orientation of the labels on each unit of the order.

In the exemplary embodiment, if, on the other hand, the user placed an order for labels with landscape orientation, then the exemplary embodiment would be programmed to recognize the user indication of a landscape orientation of the labels for an order and would be programmed to assign each unit identifier for each unit of the order to comprise an indication of a landscape orientation of the labels on each unit of the order.

In an alternative secured-paper-measure embodiment, additional or alternative secured-paper measures would be taken. For example, the pattern of invisible fluorescent ink applied to each label would comprise a machine-readable code indicating a representation of the human-readable label serial number for the respective label. As another example, micro-printing would be applied to each label, reflecting, for example, a micro-printed representation of the human-readable label serial number. Further secured-paper measures may include, for example, digital watermarking and/or applying color-changing ink, thermo chromatic ink, opaque ink, ultraviolet ink, phosphorescent ink, invisible ink, fluorescent ink and/or other types of ink, whether now known or in the future discovered that, for example, are not visible to the naked eye but that can be visible if viewed under special lighting and/or with special equipment and/or under special circumstances, and/or that change color when photocopied, and/or that are not visible on photocopies.

In the exemplary embodiment of the present invention, "sheets" of image-customized postage labels will be formatted for rendering on printable label stock (see function 207 depicted in FIG. 6). If the user ordered sheets of labels, then sheets of labels, in the number ordered by the user, will be formatted for rendering by a printer.

In the exemplary embodiment of the present invention, with the exception of generating and formatting postage indicia, the exemplary image-customizing postal label computer system will be programmed to generate and format the sheet images in the form of Portable Data Format ("PDF") files in much the same way as disclosed in U.S. patent application Entitled: "IMAGE-CUSTOMIZATION OF COMPUTER-BASED VALUE-BEARING ITEMS"; application Ser. No. 10/994,698, filed on Nov. 22, 2004 (the entire contents and disclosure of which has previously been incorporated by reference in full herein for all purposes; see, e.g., page 49, line 24 through page 60, line 16 discussing, among other things, FIG. 14A of that application).

If the user ordered rolls of labels, then a number of "sheets" of labels will be calculated, sheet identifiers will be assigned, and with the exception of postage indicia and a repeated display of a sheet ID, the "sheets" of labels will be generated, formatted and rendered by a printer, and rolls of labels will be produced, in much the same way as disclosed in U.S. patent application Entitled: "ROLLS OF IMAGE-CUSTOMIZED VALUE-BEARING ITEMS AND SYSTEMS AND METHODS FOR PROVIDING ROLLS OF IMAGE-CUSTOMIZED VALUE-BEARING ITEMS"; application Ser. No. 11/435,453, filed May 16, 2006, the entire contents and disclosure of which is hereby incorporated by reference in full herein for all purposes.

In an embodiment that provides for producing rolls of labels, a human-readable unit identifier would repeatedly displayed, such as in a margin of the roll of labels, or on an inter-label (or other non-label) section of the rolled label stock.

In the exemplary embodiment of the present invention, once a sheet image has been completely formatted with all respective image-customized label images, a machine-readable Sheet ID barcode image, and "eye mark" images, the exemplary embodiment will be programmed to save the sheet image as a file with a particular file name.

Figure 7A:
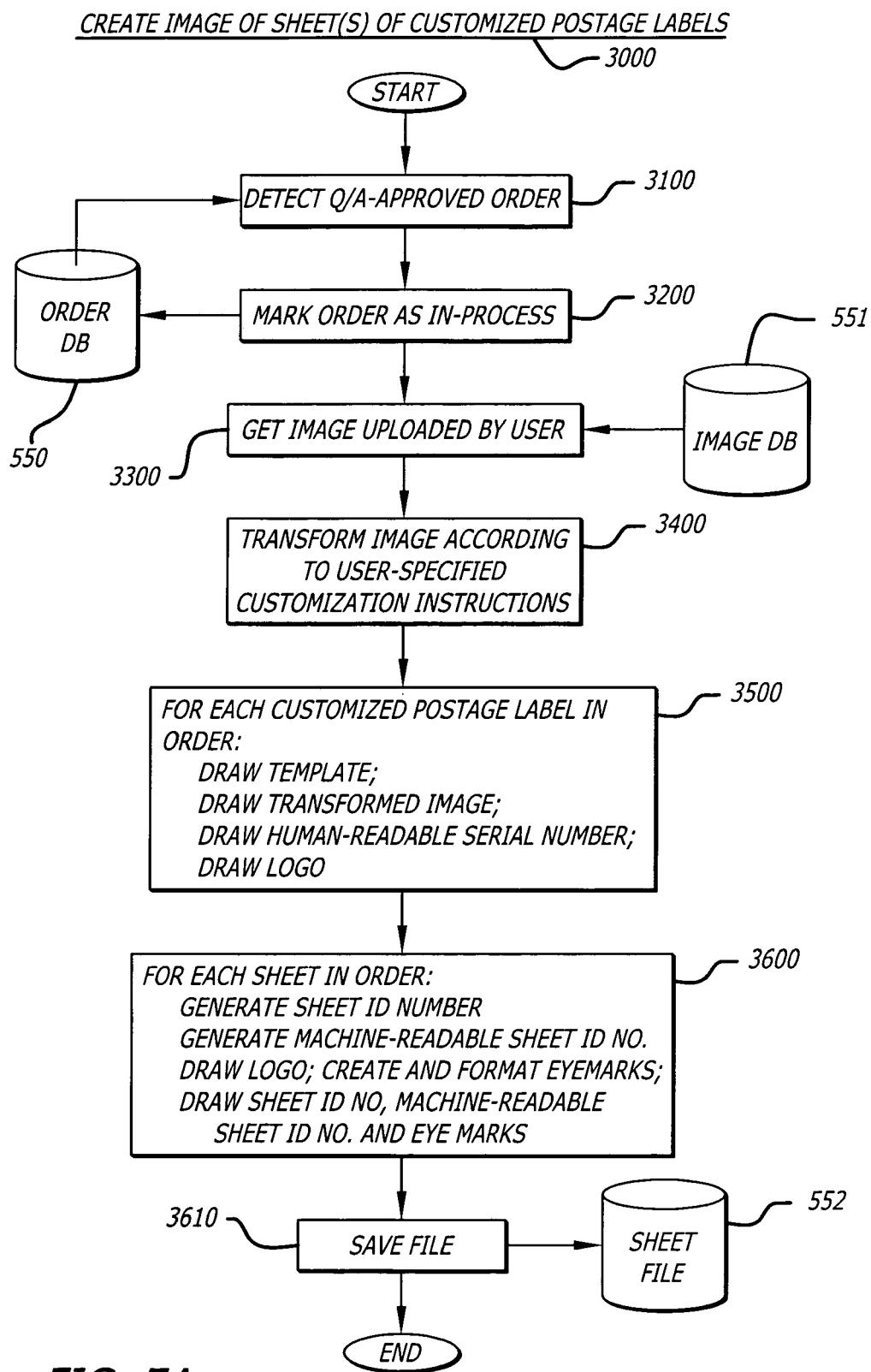
FIG. 7A is a high-level flow diagram depicting exemplary high-level logic functions for creating an image of customized postage labels in the exemplary embodiment of the present invention.

FIG. 7A is a high-level flow diagram depicting exemplary high-level logic functions for creating an image of customized postage labels in the exemplary embodiment of the present invention.

As depicted in FIG. 7A, quality-assurance-passed orders on order database 550 will be detected by software, e.g., software executing on an image generation server, as depicted in function 3100. As such quality-assurance-passed orders are detected, a status in the entry for the order, in, e.g., order database 550, will be marked, as denoted in function 3200, to indicate that the order is in-process.

As depicted in FIG. 7A, function 3300 of the exemplary embodiment of the present invention will get the original image corresponding to a particular order as that image was uploaded by the corresponding user. Function 3300 will get the original image from an image database 551. If an order includes multiple images, then each image will be retrieved.

In the exemplary embodiment, function 3400 would transform the original image according to the user-specified customization instructions. If an order includes multiple images, then each image will be transformed according to the user-specified customization instructions corresponding to each particular image relating to the particular order.

In the exemplary embodiment, for each customized postage label in the order being processed, function 3500 will perform logic functions to: draw a template for the postage label; draw the transformed image (as resulted from function 3400); draw a human-readable serial number; and draw a logo.

In the exemplary embodiment, for each sheet in the order being processed, function 3600 will generate and assign to each sheet image a Sheet Identifier ("Sheet ID") that identifies the corresponding "sheet". Exemplary Sheet ID's will be generated to comprise an indication of media type and an indication of orientation of labels.

In an alternative embodiment, a Sheet ID could comprise an indication of media type but not include an indication of an orientation.

In the exemplary embodiment of the present invention, as depicted in function 3600, once a Sheet ID is assigned to a sheet image, the exemplary embodiment will be programmed to format a barcode comprising a machine-readable representation of the Sheet ID; when the machine-readable representation of the Sheet ID is drawn, it will be drawn to incorporate the barcode in an area of a perimeter margin of the corresponding sheet.

Continuing with function 3600, in the exemplary embodiment of the present invention, the exemplary image-customizing label computer system will be programmed to create and format "eye marks"; when the eye marks are drawn, they will be drawn to incorporate the "eye marks" in certain areas of the perimeter margins of the corresponding sheet.

As will be understood by someone with ordinary skill in the art, "eye marks" can be used by certain finishing equipment to, for example, apply surface features to a printed product. In the exemplary embodiment of the present invention, "eye marks" will be formatted and incorporated as part of each exemplary sheet image to guide application by certain finishing equipment in the positional application of invisible fluorescent ink on the printed surface of each image-customized label.

Continuing with function 3600, in the exemplary embodiment of the present invention, once the above-described elements for a sheet image have been generated, the exemplary image-customizing label computer system will be programmed to draw a logo for the sheet, draw the [human-readable] Sheet ID, the machine-readable Sheet ID, and draw the eye marks.

In the exemplary embodiment, customized label features associated with an order would be represented in PDF format. Therefore, in the exemplary embodiment, the drawing in function 3600 would involve drawing multiple PDF-represented features for a particular postage label. For example, each customized postage label would be represented by a PDF-representation of a customized border image (if indicated for the order); a PDF-representation of the customized image uploaded by the user; and the like. In the exemplary embodiment, in function 3500, a PDF-formatted representation of each image for which a customized label has been ordered will be drawn in PDF format; in function 3600, for each sheet in the order, an image of a sheet of labels will be drawn in PDF format.

In the exemplary embodiment of the present invention, the Sheet ID's and sheet image file names will comprise: A.) a file group ID of "2000"; B.) a day counter that will be incremented for each day; C.) a sheet number in the day that will be initialized to one for each file group ID and day counter combination and be incremented for each sheet produced for the file group; D.) a sheet number in the order, which will be a specific sheet number in the customer order; and E.) a total sheets in the order, which will remain fixed on each sheet in the order. In the exemplary embodiment, the sheet number in the order, and the total sheets in the order will not be incorporated in the machine-readable representation of the Sheet ID.

With reference to function 3610, once a sheet image has been completely formatted, including the appropriate number image-customized label images for the relevant media type, a logo, a human-readable Sheet ID, a machine-readable Sheet ID barcode image, and "eye mark" images, the exemplary image-customizing label computer system will be programmed to assemble the sheet image as part of a sheet image file. Once all of the sheet images in an order have been assembled in a filed, the file is save on a sheet file 552 with a particular File Identifier (File ID) as described further below.

In the exemplary embodiment of the present invention, File ID's will comprise: A.) a file group ID, which in the exemplary embodiment, may comprise the number "2000" for regular orders, "2010" for expedited orders, or "2020" for rush orders; B.) a day counter, which will be incremented each day; and C.) a file number for the group and day, which will be initialized to one at the beginning of a day and will be incremented for each file for the day.

The exemplary embodiment of the present invention will be programmed to periodically save a batch of saved sheet image files onto an encrypted hard drive for printing.

The exemplary embodiment of the present invention will be programmed to count the total number of sheets/files in a batch and ensure that all of the sheets/files in the batch are present and in sequential order. Missing sheets would be reported.

The exemplary embodiment of the present invention will populate and print a shipping manifest for shipment with a fulfilled order of image-customized postage labels.

In the exemplary embodiment of the present invention, each batched file will then be converted to a format that can be used by a print-rendering device (such as a printer); the resulting converted file will be provided to a print-rendering device.

In the exemplary embodiment of the present invention, a high-speed label printer, such as, for example, an HP® Indigo press ws4050 (produced by Hewlett-Packard Company of 20 Perimeter Summit Blvd., Atlanta, Ga.) will be used as an exemplary device for rendering image-customized postage labels onto the exemplary thirteen inch (13") wide pressure sensitive, liner-backed, self-adhesive label stock (see function 209 depicted in FIG. 6).

It will be understood by someone with ordinary skill in the art that description of use in the exemplary embodiment of a roll of exemplary thirteen inch (13") wide pressure sensitive, liner-backed, self-adhesive label stock is not a limitation of the present invention. Rather, sheets of pressure sensitive, liner-backed, self-adhesive label stock could be used in an alternative embodiment. Further, alternative print-rendering devices could be used that would operate with rolls of a different width.

In the exemplary embodiment of the present invention, the pressure sensitive, liner-backed, self-adhesive label stock that will be used will meet both USPS postage label specifications and will meet requirements for high-speed postage applicator devices, such as high-speed postage applicator devices made by, e.g., VERTIS MANUFACTURING. For example, in the exemplary embodiment, the exemplary default label stock will be fifty-four pound (54#) white semi-gloss label stock; the default label stock will have a permanent adhesive that meets USPS postage label specifications that require that the label, once applied, cannot be removed from the medium to which it has been applied after forty-eight (48) hours of the label having been applied without tearing either the label or the medium. For example, in the exemplary embodiment, the default label stock will have a permanent acrylic emulsion adhesive. In the exemplary embodiment, the default label stock will have a forty pound (40#) "SCK" liner backing. In the exemplary embodiment, image-customized postage labels will be printed using a four-color (polychromatic) ink process of at least 300 by 300 dots per inch (300×300 dpi).

In the exemplary embodiment of the present invention, the print-rendering device will render each sheet image file on to a respective sheet portion of a roll of liner-backed adhesive label stock. Once the sheet images for an order have been printed, the Sheet ID barcode on each sheet will be scanned (see function 209 depicted in FIG. 6). An exemplary print manifest computer program will be executed that will check all of the scanned Sheet ID's for an order to ensure that all of the sheets in an order have been printed, that no duplicate sheets have been printed, and that all of the sheets are in sequential order. The exemplary print manifest computer program will report missing sheets, duplicate sheets and out of order sheets for manual resolution.

In the exemplary embodiment of the present invention, the printed label stock for all Sheets in an order will then be fed through a special piece of equipment that applies a pattern of fluorescent ink (see function 209 depicted in FIG. 6) to each image-customized postage label on each Sheet in the order and that kiss-cuts a border around each image-customized postage label on each Sheet in the order; the border will be kiss-cut according to the media type indicated for the order. In the exemplary embodiment of the present invention, a device such as an OMEGA DIGICON™ S (provided by ABG International) will be used to apply the fluorescent ink pattern and kiss-cut the labels.

In the exemplary embodiment of the present invention, a device such as an OMEGA DIGICON™ S (provided by ABG International) will be used to apply clear (sometimes referred to as "invisible") fluorescent ink to each printed postage label on each "sheet" of image-customized postage labels in an order. The exemplary embodiment will be programmed to format application of the clear fluorescent ink according to the media type for the order and according to the indication of orientation of the labels of the order.

In the exemplary embodiment, a particular pattern of (clear/invisible) fluorescent ink will be applied in order to facilitate cancellation by the postal service. In the exemplary embodiment of the present invention, the fluorescent ink will meet USPS requirements for a target six hundred twenty (620) nm wave length luminescence and red indicator; and will have luminescence levels less than twenty-three (23) PMU on a red fluorescent sensor. The clear (invisible) fluorescent pattern will be applied in the exemplary embodiment of the present invention in a manner so that the clear fluorescent pattern can be detected by a USPS AFCS (Automated Facing Cancellation System) during facing and sorting operations by the USPS.

It will be understood by someone with ordinary skill in the art that application of a pattern of fluorescent ink to each exemplary image-customized postage label is not a limitation of the invention. Other means, whether now known or in the future discovered, could be used to facilitate USPS automated facing and cancellation without departing from the spirit of the present invention.

In the exemplary embodiment, the "eye marks" on each sheet of the order will be used by the device applying the fluorescent ink (such as an OMEGA DIGICON™ S (provided by ABG International)), to determine with precision the location on each sheet for application of the fluorescent ink.

In the exemplary embodiment of the present invention, a device such as an OMEGA DIGICON™ S (provided by ABG International) will be used to kiss-cut (die-cut) (see function 209 depicted in FIG. 6) a border around each image-customized postage label on each "Sheet" in the order so that the kiss-cut will pierce the adhesive-backed label but will not pierce the label liner. The exemplary embodiment will be programmed to instruct the die-cutting device to die-cut (in the exemplary embodiment, to "kiss-cut") a pattern for application to printed sheets of image-customized labels according to the media type indicated for the order. It will be understood by someone with ordinary skill in the art that the description of the exemplary embodiment of kiss-cutting the liner-backed, self-adhesive label stock so that the kiss-cut will pierce the adhesive-backed label but will not pierce the label liner is not a limitation of the invention.

In the exemplary embodiment, the image-customized postage label will be kiss-cut so that at least one-thirty-second of an inch (1/32") of clear space will surround the printed image of the entire image-customized postage label on all sides. That is, there will be at least one-thirty-second of an inch (1/32") of clear space between the printed image of the entire image-customized postage label and the kiss-cut on all sides.

After die-cutting the labels, the sheets would be trimmed, removing, among other things, the "eye marks" and Sheet ID barcode (see function 209 depicted in FIG. 6).

Figure 7B:
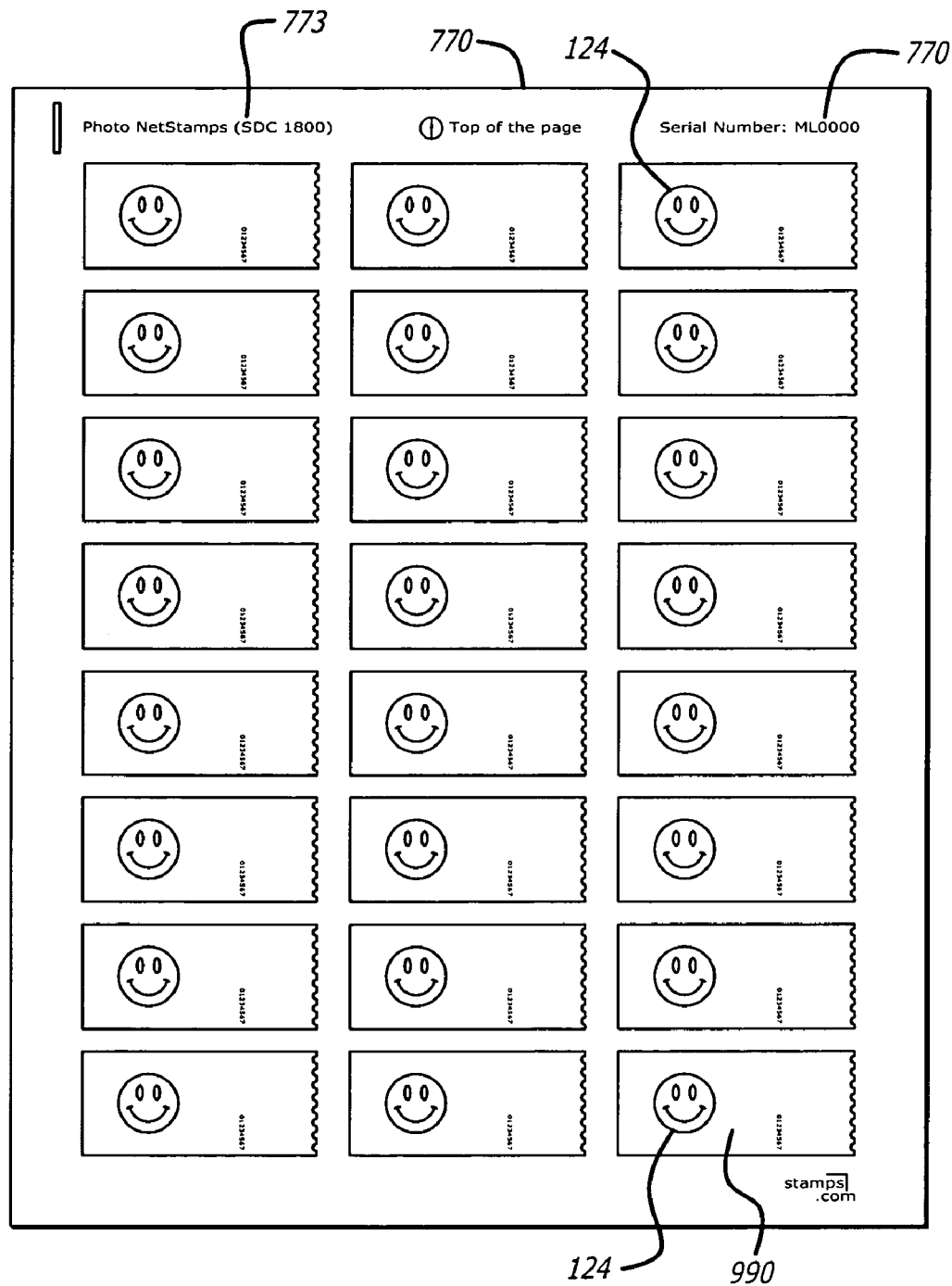
FIG. 7B is a graphic representation of an exemplary sheet of labels in landscape orientation in an exemplary embodiment of the present invention.
Figure 7C:
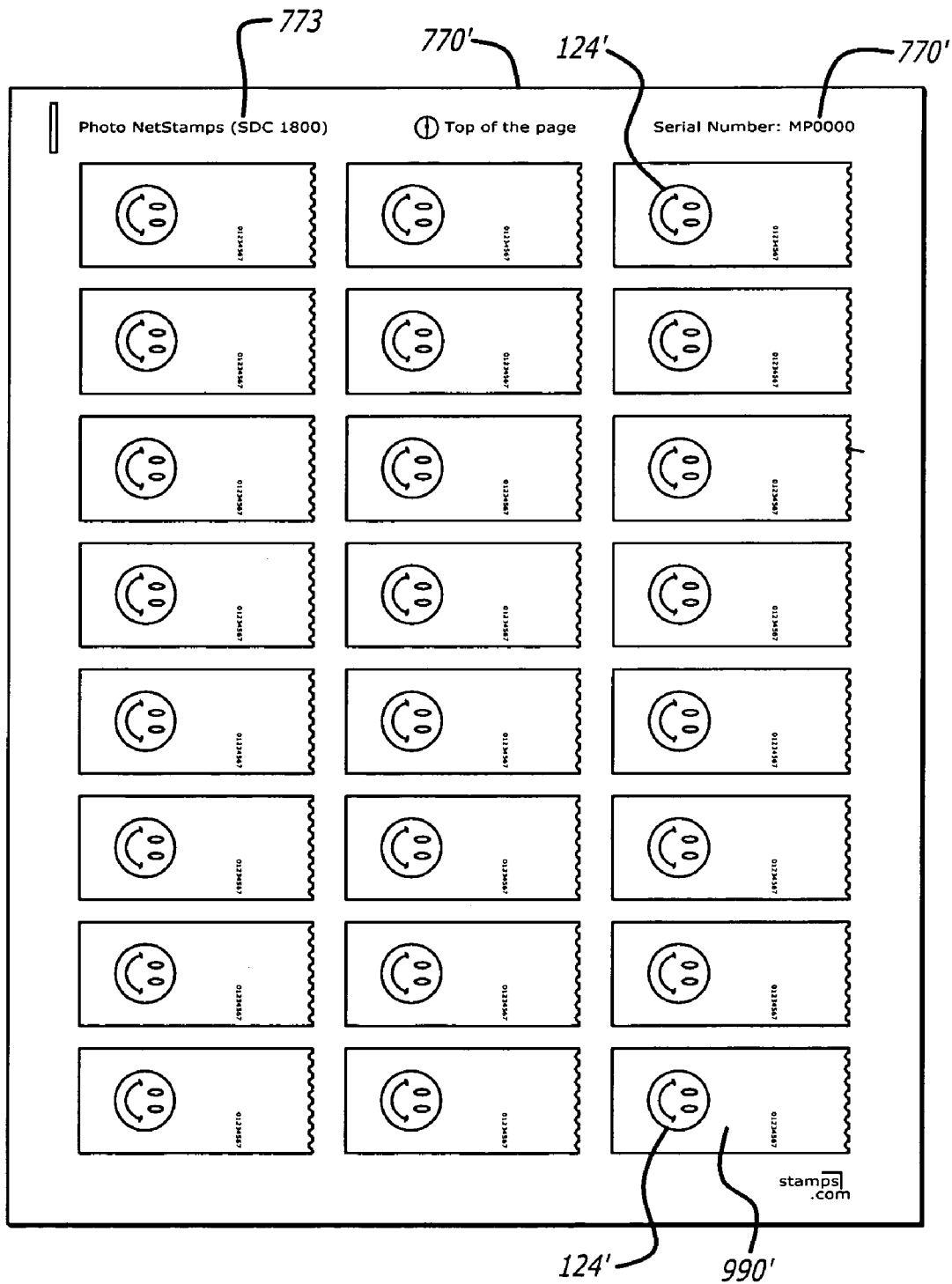
FIG. 7C is a graphic representation of an exemplary sheet of labels adapted for portrait orientation in an exemplary embodiment of the present invention.

FIGS. 7B and 7C depict two different exemplary sheets of labels. FIG. 7B is a graphic representation of an exemplary sheet of labels in landscape orientation in an exemplary embodiment of the present invention. FIG. 7C is a graphic representation of an exemplary sheet of labels adapted for portrait orientation in an exemplary embodiment of the present invention.

Both of the respective sheets of labels in FIGS. 7B and 7C are of the same form factor 773 (e.g., "SDC 1800"). However, the labels, e.g., label 990, depicted on the exemplary sheet of labels 770 in FIG. 7B are in landscape format as can be seen by the landscape orientation of the image 124. The mock unit identifier 770 depicted in FIG. 7B is "ML000", wherein, for example, the "M" of the mock unit identifier 770 corresponds to the "SDC 1800" form factor, and wherein, for example, the "L" of the mock unit identifier 770 corresponds to the landscape orientation of the labels.

As compared to the landscape-oriented labels depicted in FIG. 7B, the labels, e.g., label 990', depicted in FIG. 7C are adapted for portrait orientation as can be seen by the portrait orientation of the image 124'. The mock unit identifier 770' depicted in FIG. 7C is "MP000", wherein, for example, the "M" of the mock unit identifier 770' corresponds to the "SDC 1800" form factor, and wherein, for example, the "P" of the mock unit identifier 770' corresponds to the portrait orientation of the labels.

It will be understood by someone with ordinary skill in the art that the discussion of mock unit identifiers comprising multiple characters is exemplary and illustrative. Various embodiments of the present invention could display single character unit identifiers. Depending on the embodiment, a single character unit identifier could correspond to a media type or to a combination of a media type and an orientation indicator.

If instead of sheets of labels, rolls of labels were ordered, "sheets" of labels would be sliced in much the same way as disclosed in U.S. patent application Entitled: "ROLLS OF IMAGE-CUSTOMIZED VALUE-BEARING ITEMS AND SYSTEMS AND METHODS FOR PROVIDING ROLLS OF IMAGE-CUSTOMIZED VALUE-BEARING ITEMS"; application Ser. No. 11/435,453, filed May 16, 2006, the entire contents and disclosure of which was previously incorporated by reference in full herein for all purposes. However, in various embodiments, if rolls of labels were ordered, the "sheets" of labels that would be formatted and printed would include a repeated display of the unit identifier (the roll identifier) in a non-label portion of each column of labels; the repeated display of the unit identifier would be visible as the roll of labels was used in proximity to unused labels. Alternatively, the unit identifier would be displayed as part of an identifier displayed on each label.

Finalized sheets of image-customized labels in an order will be assembled and shipped to either the ordering user, or depending on shipping instructions provided by the user as part of the order, to a party designated by the user, as the case may be (the "designated recipient user", or alternatively, the "receiving user").

Once the designated recipient user, or the receiving user, has received the image-customized labels, the receiving user would then access an authorized computer-based, generic, postage provider website (e.g., element 19, FIG. 1), such as, for example, www.stamps.com. The receiving user would access the authorized computer-based, generic, postage provider website via a client computer device, e.g., client computer device 10a as depicted in FIG. 1.

The exemplary embodiment of the present invention is provided by an exemplary computer-based, software-based, online postage system. However, it will be understood by someone with ordinary skill in the art that the present invention may be implemented by a variety of generic postage metering systems in accordance with a variety of print requirements promulgated by postal systems around the world. Further, although an exemplary operation of the present invention is described below in accordance with USPS requirements for PC-based postal printing, the present invention is not limited to applications in accordance with the USPS requirements. Rather, the present invention is equally applicable for operation in all PC postage printing and VBI indicia printing systems.

Computer-based, software-based, on-line postage systems are now well-known in the art. An example software-based, on-line postage system is described in U.S. patent application Ser. No. 09/163,993 filed on Sep. 29, 1998, entitled "On Line Postage System", the contents of which are hereby incorporated by reference for all purposes as if fully set forth herein. As therein disclosed, an exemplary on-line postage system software comprises user code, also sometimes referred to as client software, that resides on each client system accessing an on-line postage enabled server system; controller code resides on the on-line postage-enabled server system. An exemplary on-line postage system may comprise a user/client system electronically connected to a server system, which in turn is connected to a USPS system. The server system is preferably capable of communicating with one or more client systems simultaneously.

In order to print VBI indicia, such as postage stamps, using an exemplary software-based on-line VBI indicia system, a user first registers (user registration is typically a one-time event, but would not necessarily be so) with the system; in the case of postage, the user obtains a license from the USPS to print postage. In operation, a licensed and registered client of the on-line postage system sends a request for authorization to print a desired amount of postage. A postal security device (PSD) server determines whether the client's account balance is sufficient to cover the requested amount of postage, and if so, communicates an authorization to the client system. The client system then sends image information for printing postal indicium for the granted amount to a printer so that the postal indicium is printed on the print media, such as for example a label. Once the postage information is printed on an individual label it may be subsequently placed on an individual mail piece with a recipient of the users choosing and mailed and processed by the USPS.

In various embodiments, the PSD server provides an ascending register ("AR") that records the amount of postage that is dispensed or printed on each transaction and a descending register ("DR") that records the value or amount of postage that may be dispensed and decreases the amount remaining from an original amount by a charged amount as postage is printed. An exemplary PSD may further include a device ID, indicia key certificate serial number, licensing ZIP code, key token for the indicia signing key, date and time of last transaction, a last challenge received from the client, an operational state of the PSD, expiration dates for keys, a passphrase repetition list and the like.

Accessing the authorized computer-based, generic, postage provider website (e.g., element 19, FIG. 1), the receiving user would then choose to order computer-based, generic postage, such as is provided under the name of "NETSTAMPS™" at www.stamps.com, or as disclosed, for example, in U.S. patent application Ser. No. 09/975,532 entitled "SYSTEM AND METHOD FOR PROVIDING COMPUTER-BASED POSTAGE STAMPS", the contents and disclosures of which have previously been incorporated by reference in full herein for all purposes as if fully stated here.

At the authorized computer-based, generic, postage provider website (e.g., element 19, FIG. 1), the receiving user would input in an input field provided by a graphic user interface displayed by the authorized computer-based, generic, postage provider website (e.g., element 19, FIG. 1) (or alternatively, by client software or web-based client software enabled to communicate with the authorized computer-based, generic, postage provider website), the unit identifier, such as the sheet identifier for a particular sheet of image-customized labels. The receiving user would also input a postage amount to be printed. Using features provided by the authorized computer-based, generic, postage provider website, the receiving user would also designate one or more of the image-customized labels for printing the designated amount of postage. For example, the receiving user could input the label identifier(s) for the labels on which postage is to be printed.

Reference herein to client software will be understood by someone with ordinary skill in the art to include software installed on a client computer, as well as web-based software, and other software used by a client computer.

The authorized computer-based, generic, postage provider website (e.g., element 19, FIG. 1) (or alternatively, by client software enabled to communicate with the authorized computer-based, generic, postage provider website) would validate the receiving user as an authorized user. The authorized computer-based, generic, postage provider website (e.g., element 19, FIG. 1) (or alternatively, by client software enabled to communicate with the authorized computer-based, generic, postage provider website) would also validate the sheet or unit identifier and the label identifier(s) input by the receiving user.

Figure 15:
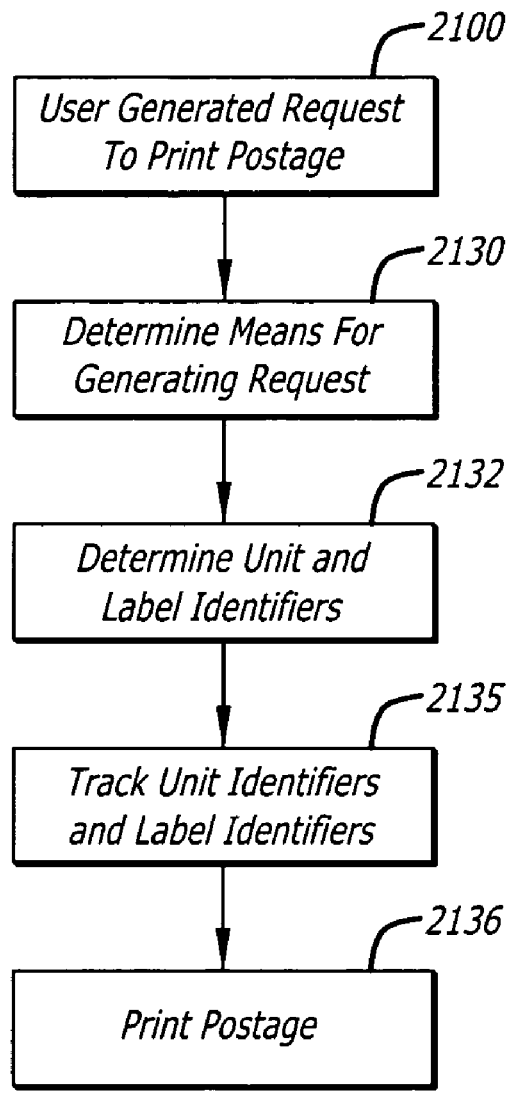
FIG. 15 is a high-level flow diagram depicting high level functionality of an exemplary operation of an exemplary system for generating generic postage in an exemplary embodiment of the present invention.

FIG. 15 is a high-level flow diagram depicting high level functionality of an exemplary operation of an exemplary system for generating generic postage in an exemplary embodiment of the present invention. As depicted in FIG. 15, a user would first enter in process 2100 a request to print desired postage. The exemplary software-based on-line generic postage system would provide a user interface comprising a plurality of user interface input screens via which a user may specify and print generic postage stamps for use with one of a plurality of postage classes, including standard first class service as well as other specialty services. For example, in various embodiments, wizard-based prompts would be provided to assist users in determining the type/class of postage to print. In addition, a second interface would be provided that would allow customers to simply enter the postage rate and print generic postage stamps.

Continuing with reference to FIG. 15, in the exemplary embodiment; the indicia generation process would determine in process 2130 whether a print wizard was used to generate the request to print generic postage stamps. If a print wizard was used to generate the request, the class selected within the wizard will be the class included in the generic postage stamps. If a wizard was not used, the rate class will default to first class. In the exemplary embodiment, a user would be able to select any denomination of postage desired, up to the maximum limit defined by the PCIBI-O, that is currently $999.99.

It will be understood by someone with ordinary skill in the art that the description herein of the exemplary embodiment providing a wizard is exemplary and illustrative and is not a limitation of the invention.

As depicted in FIG. 15, the exemplary system would then determine in process 2132 the unit and label identifiers. One way in which the unit and label identifiers would be determined would be by way of a unit and label identifier being entered by a user. Another way in which a label identifier would be determined would be by way of a user indicating (e.g., clicking on) a particular label on an interactive label stock preview display (see, e.g., 504, FIG. 10).

Continuing with reference to FIG. 15, in the exemplary embodiment, unit and label identifiers would be tracked in process 2135 by the server. When a unit of label stock has been used, the server would flag the meter number that used label stock associated with the unit and labels used.

In the exemplary embodiment, if the user prints generic postage stamps on a portion of label stock, the user will be able to print indicia on the remaining labels included in the label stock at a later time. However, in the exemplary embodiment, only the meter that initially used the label stock will be permitted to print the remaining labels.

Once all labels included in the label stock have been printed, the associated unit and label identifiers will be flagged, and any attempts to print a label using those unit and label identifiers will be rejected by the server. In the exemplary embodiment, all possible unit and label identifiers will not be initially activated. Rather, only label stock and labels having unit and label identifiers that have been produced and placed into distribution will be activated and available for use. Continuing with FIG. 15, a user may print in process 2136 postage or sample postage onto the label stock.

Figure 10:
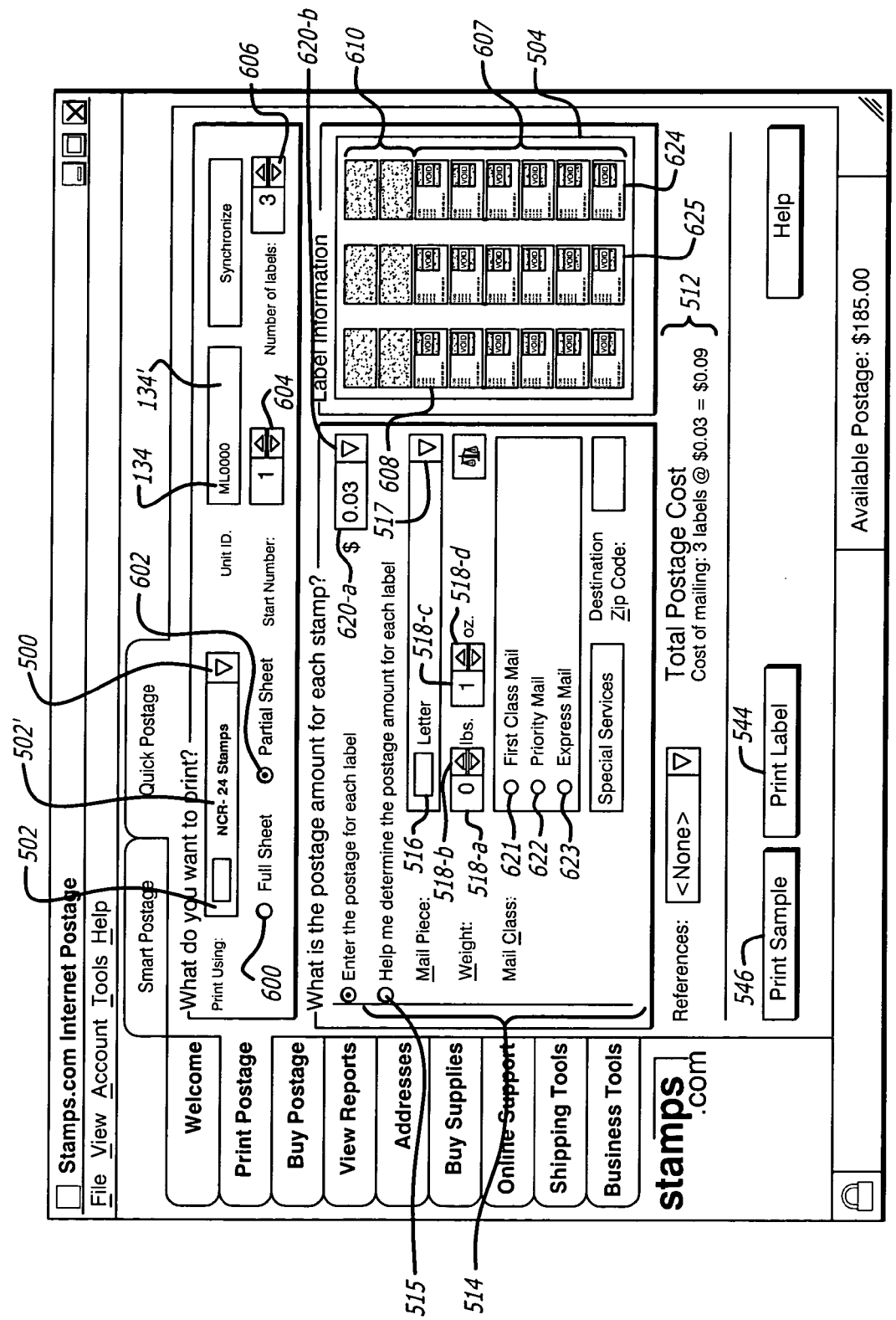
FIG. 10 is a graphic representation depicting a screen shot of an exemplary generic postage printing user interface in an exemplary embodiment of the present invention.

FIG. 10 is a graphic representation depicting a screen shot of an exemplary generic postage printing user interface in an exemplary embodiment of the present invention. As depicted in FIG. 10, the exemplary user interface would provide an input window 620-*a* into which a user may enter a postage amount, such as for example, $0.03, in a free form, or by using a pull-down menu button 620-*b* to select a pre-identified denomination of postage from a list of postage denominations (an expanded pull-down menu of postage denominations is not shown).

The user interface would also provide options 514 to allow the user to request postage calculation. For example, the exemplary user interface would provide an option 515 to indicate to the exemplary user interface that the user wants the system to calculate postage. The exemplary user interface would provide corresponding input fields e.g., 516, for the user to identify the type of package or letter (using, e.g., a pull-down menu button 517 to pull down a menu of pre-identified letter and package types (not shown)). The exemplary user interface would provide input fields for weight (including pounds input field 518-*a*, pounds up and down buttons 518-*b*, ounces input field 518-*c* and ounces up and down buttons 518*d*). The exemplary user interface would also provide Mail Class designation options, such as, for example, "First Class" mail class option 621, "Priority Mail" mail class option 622, and "Express Mail" mail class option 623. Other mail classes, including International, Parcel Post, and the like, could also be provided (not shown).

The exemplary user interface would provide a media type input field 502 for a user to input a media type and would provide a media type pull-down menu button 500 for pulling down a menu of various menu types. The media type input field 502 and media type pull-down menu button 500 could be used by a user that wants to print postage indicia on standard manufactured generic postage labels. In the exemplary embodiment depicted in FIG. 10, the exemplary system will also provide a unit identifier input field 134' that will be used with the form factor identification process described in more detail below to identify the form factor (see, e.g., element 502') according to the unit identifier 134 input by the user. Once the system has identified the form factor (see, e.g., element 502'), the system will generate an exemplary label preview 504 such as is depicted in FIG. 10.

It will be understood by someone with ordinary skill in the art that other system embodiments of the present invention may not provide any mechanism for user input or selection of label stock, such as is provided in FIG. 10 (e.g., pull-down menu button 500 with which to identify a form factor 502). Such other system embodiments of the present invention would rely on the system to identify the form factor exclusively based on the user's input of a unit identifier.

The exemplary user interface would provide "Print Sample" 546 and Print Label 544 options. The exemplary user interface would further provide a "Total Postage Cost" 512 for the order of postage.

For authorized users, and for a valid sheet or unit identifier and for valid label identifiers, the authorized computer-based, generic, postage provider website (e.g., element 19, FIG. 1) (or alternatively, by client software or web-based client software enabled to communicate with the authorized computer-based, generic, postage provider website) would generate generic postage indicia in a manner, and with the accounting and safeguards, such as described in U.S. patent application Ser. No. 09/975,532 entitled "SYSTEM AND METHOD FOR PROVIDING COMPUTER-BASED POSTAGE STAMPS", the contents and disclosures of which have previously been incorporated by reference in full herein for all purposes as if fully stated here.

Because an order may correspond to any one of a plurality of media types, the exemplary embodiment will be programmed to format the generic postage indicia according to the media type for the unit of label stock on which postage indicia is to be printed, as indicated by the unit identifier 134 input by the user.

It will be understood by someone with ordinary skill in the art that each media type may have particular formatting requirements. For example, spatial relationships between components of what is to be printed, e.g., VBI, could vary from one media type to another. As another example, spatial relationships between components of what is to be printed, e.g., VBI, and the dimensions of the media type on which it is to be printed, could vary from one media type to another. That is, for a first distinct single-part label set configuration, a bar code may need to be printed in a particular location on each label of the particular label set. If a second single-part label set configuration were used, using the format for the first distinct label set configuration to print the bar code on the second single-part media type could result in the bar code being printed in a position outside, or partially outside, of the perimeter of a particular label.

Therefore, before printing VBI, the exemplary embodiment should first receive from the receiving user an indication of the media type for the order of postage (that is, the media type on which VBI, such as postage indicia, is to be printed). In the exemplary embodiment, the receiving user will indicate the media type for the order to the exemplary embodiment by inputting the unit identifier.

In addition to considering the media type in the formatting of the generic postage indicia, the exemplary embodiment would be programmed to format the generic postage indicia according to the label orientation for the label as well. In the exemplary embodiment, the receiving user will indicate the orientation for the labels of order to the exemplary embodiment by inputting the unit identifier.

It will be understood by someone with ordinary skill in the art that various numbering or identification schemes could be used to identify media type and/or portrait orientation in a sheet identifier. In the exemplary embodiment, a first leading character of the sheet identifier indicates the media type, and a second leading character indicates the orientation (e.g., "P" for Portrait or "L" for Landscape).

It will be understood by someone with ordinary skill in the art that reference herein to the term "character" will include reference to alphabetic, numeric and symbols (sometimes referred to as "special characters", including but not limited to, for example, "?", "!", "@", "#", "$", "%", "^", "&", and other non-alphabetic and non-numeric characters).

It will also be understood by someone with ordinary skill in the art that in some alternative exemplary embodiments, an identifier other than a unit identifier could be printed on label stock; the identifier would be used to identify media type, or media type and orientation; information relating the identifier to the corresponding media type and/or orientation could be stored in the system and used to correlate an input of an identifier to a particular media type and/or orientation so that information to be printed could be properly formatted for the particular media type and/or label orientation. Such an identifier could be a form factor, or could be a special or alphanumeric character that could be translated to a form factor. The term "form factor" is sometimes used herein to refer to an indicator, or identifier, of a particular media type.

In the exemplary system embodiment of the present invention, a Label Type Format database (see element 1214, FIG. 8) will be provided that will identify, for each print media type and each orientation for the relevant media type, postage indicia formatting information, which may include one or more of the following, but is not limited to, the size (including but not limited to the size of each label; the size of each label set; and the size of the stock on which the labels/label sets are provided), dimensions (of each label; of each label set; and of the stock on which the labels/label sets are provided) and configuration characteristics (e.g., specific spatial relationships between labels in a set; specific spatial relationships between label sets; spatial relationships between labels/label sets and the stock on which the labels/label sets are provided) of the particular media type; and a location and size of an area of each label adapted for receiving generic postage indicia according to the orientation of the label.

It will be understood by someone with ordinary skill in the art that the forms database could be located at any one of various places, including in the client system, in memory, or, for example, the forms database could alternatively be accessed by the server system.

It will be also understood by someone with ordinary skill in the art that the information described for the Unit Identifier and Label Type Format databases could be maintained in a single database.

Figure 8:
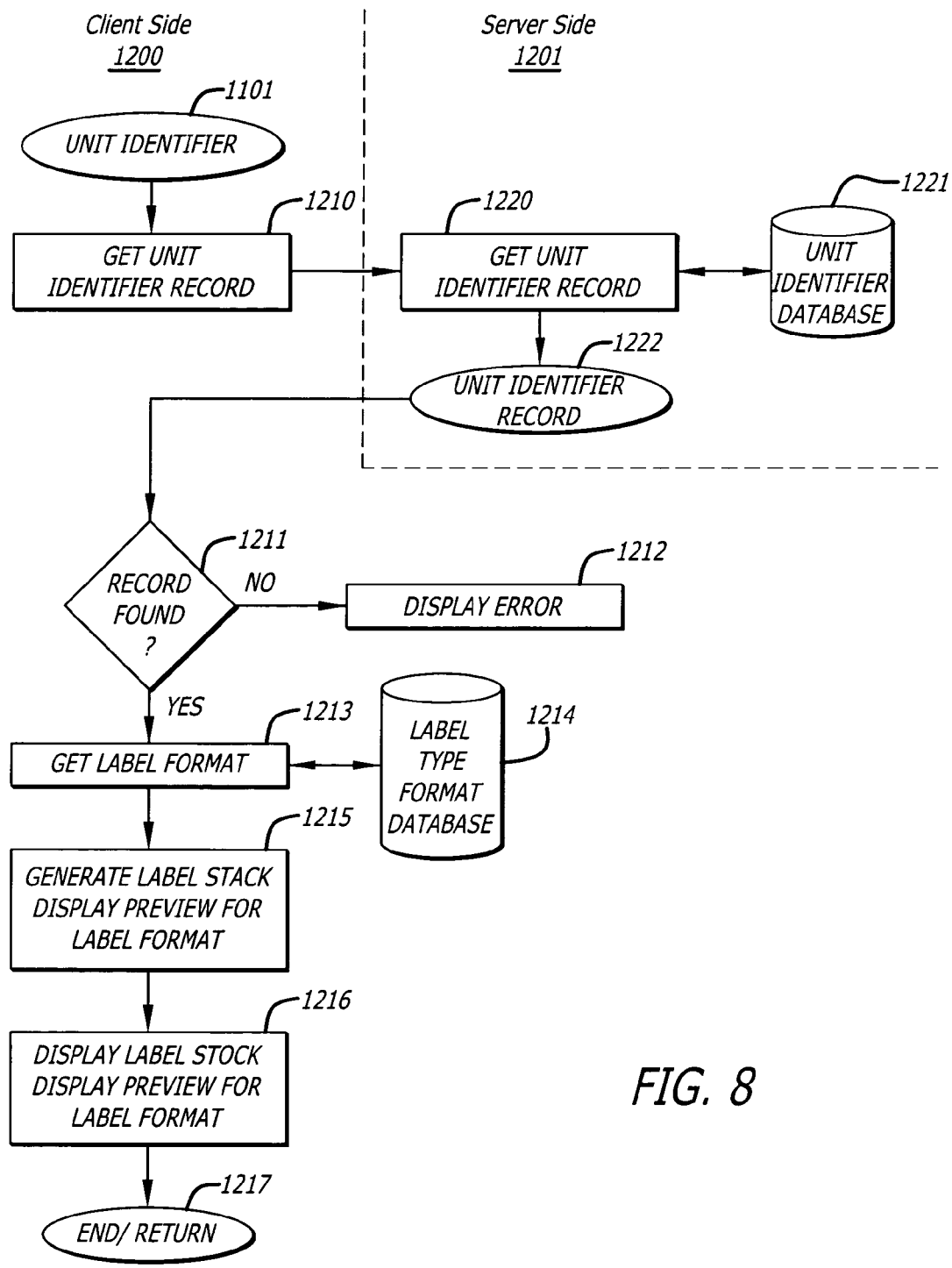
FIG. 8 is a high level flow diagram depicting high level functionality of an embodiment of a client side interface of the present invention and certain interactive functions with an embodiment of a server side of the present invention.

FIG. 8 is a high level flow diagram depicting high level functionality of an embodiment of a client side user interface 1200 of the present invention and certain interactive functions with an embodiment of a server side 1201 of the present invention.

It will be understood by someone with ordinary skill in, the art that the depiction of particular functions being performed on the client side, or the server side, of the exemplary embodiment of the present invention is illustrative; further alternative structures for function performance are possible without departing from the spirit of the present invention.

A Unit Identifier database (see element 1221, FIG. 8) will be provided that will identify, among other things, a label type (form factor) for each unit identifier that has been produced by the exemplary embodiment.

As depicted in FIG. 8, in various embodiments of the present invention, a client side user interface 1200 will receive the user input Unit Identifier 1101 in process 1210. In response to receiving the user input Unit Identifier 1101 in process 1210, client side user interface 1200 will then instruct in process 1210 the server system to query the database 1221 of valid Unit Identifiers using the user input Unit Identifier 1101 as a key to get a record of information associated with the Unit Identifier 1101.

In response to the instructions from the client side 1200, the server side 1201 of the system will read in process 1220 the Unit Identifier database 1221. If the server side 1201 of the system finds a match of the input Unit Identifier 1101 on the Unit Identifier database 1221, the server side 1201 of the system will return the record 1222 of information from the Unit Identifier database 1221 associated with the Unit Identifier 1101 to the client side 1200 user interface. In various embodiments of the present invention, an exemplary Unit Identifier database record 1222 would include, among other things, a media type (media label type (form factor)) and/or orientation.

Continuing with reference to FIG. 8, in various embodiments of the present invention, the client side 1200 will test in function 1211 to see if any record was found. If no record was found, then the client side 1200 will display in function 1212 an instructive error message to the user's display monitor. If the Server Side 1201 returns a Unit Identifier record 1222, then the client side 1200 will use the media label type from the returned Unit Identifier Record 1222 to get in function 1213 a label format from a Label Type Format (Forms) Database 1214 corresponding to the returned media label type and/or orientation.

The client side 1200 will then generate in function 1215 a label stock preview display corresponding to the returned label format. In the exemplary embodiment, the exemplary client side 1200 will display in function 1216 a label stock preview display (see, e.g., 504, FIG. 10) to the user's display monitor, and will end in function 1217 the initial display function of the client side user interface 1200.

In various embodiments of the present invention, the label stock preview display (see, e.g., 504, FIG. 10) will be interactive. In various embodiments in which the label stock preview display (see, e.g., 504, FIG. 10) is interactive, a user would be able to identify to the system the label(s) on which generic value-bearing item indicia is to be printed by "clicking" (by placing the user's online cursor on) the label(s) on which generic value-bearing item indicia is to be printed. As previously mentioned above, in various embodiments, individual labels would not display a label identifier, such as a serial number. However, in an embodiment in which individual labels would not display a label identifier, such as a serial number, an interactive label stock preview display (see, e.g., 504, FIG. 10) would provide a user with a way to indicate to the embodiment the label(s) on which generic value-bearing item indicia is to be printed.

In the exemplary embodiment, the interactive label stock preview 504 would display in label displays, such as label displays 624 and 625, a mock image rather than the exact image that appears on the user's labels. In various embodiments, the interactive label stock preview 504 would display in label displays, such as label displays 624 and 625, the image that appears on the user's labels.

In alternative embodiments of the present invention in which individual labels do not bear a label identifier, the receiving user would otherwise indicate to the relative embodiment, the label(s) on which to print the generic value-bearing item indicia. For example, in an interactive user interface display of a sheet of labels, the user would "click" (by placing the receiving user's online cursor on) the label(s) on which generic value-bearing item indicia is to be printed.

Figure 9:
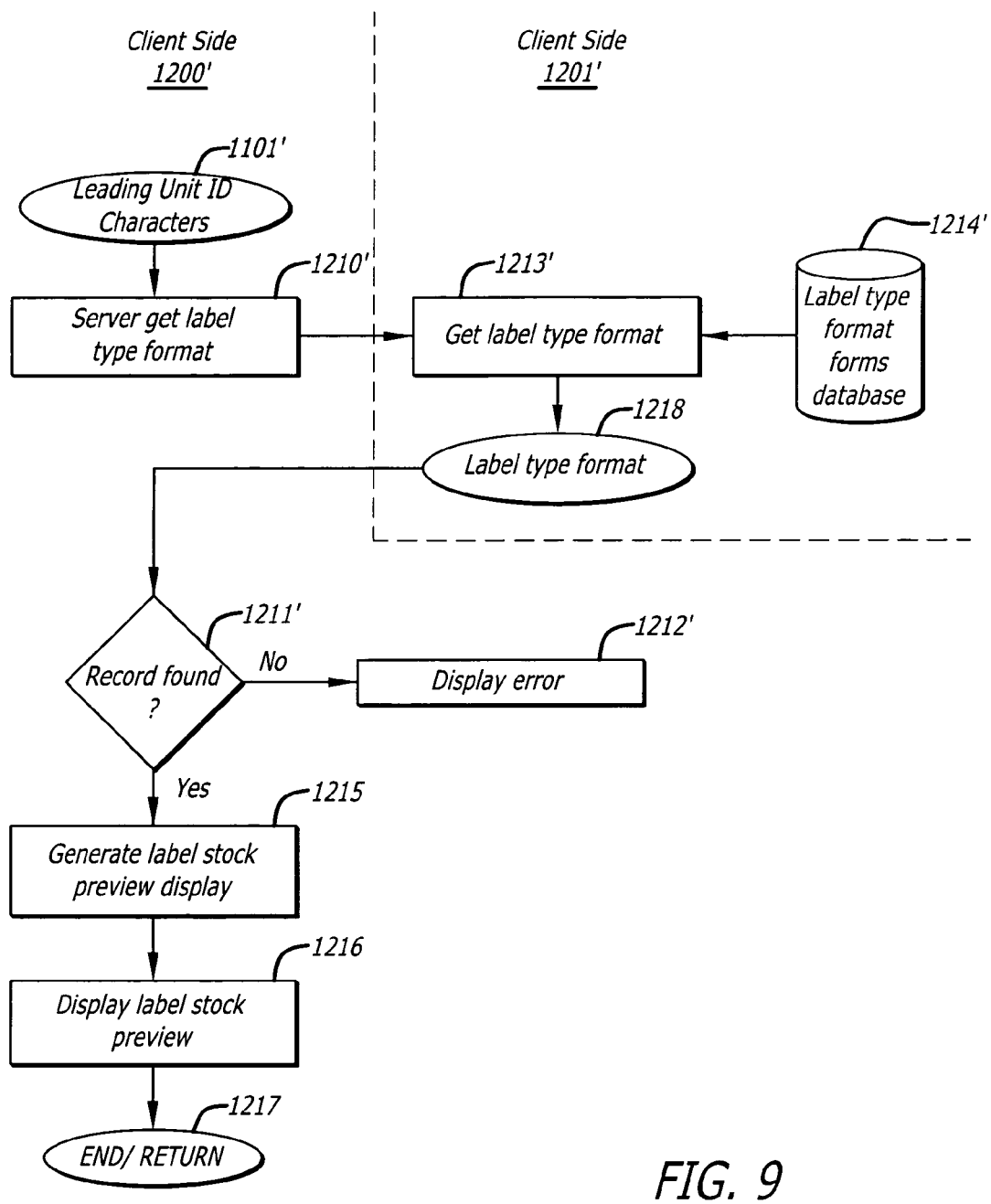
FIG. 9 is a high level flow diagram depicting high level functionality of an exemplary client side interface of the present invention and certain interactive functions with the exemplary embodiment of a server side of the present invention.

FIG. 9 is a high level flow diagram depicting high level functionality of an exemplary client side interface of the present invention and certain interactive functions with the exemplary embodiment of a server side of the present invention. In the exemplary embodiment of the present invention, in order to identify the media type form factor (e.g., element 502' depicted in FIG. 10), only a designated number of characters of the user-supplied unit identifier would be needed to identify a media label type and/or orientation—for example, a designated leading number of characters of the user-supplied unit identifier would comprise a media label type and orientation identifier. The preceding description of the designated number of characters being the leading number of characters of the user-supplied unit identifier is illustrative and non-limiting. Alternatively, the characters of the unit identifier identifying media type and/or orientation would not necessarily need to comprise leading characters but could be characters located anywhere within the unit identifier. As a further alternative, a single-character unit identifier could be used to identify media type, or to identify media type and orientation. FIG. 9 depicts high level functionality of the exemplary embodiment in which a designated leading number of characters of the user-supplied unit identifier (Unit ID) comprise a media label type identifier.

In the exemplary embodiment depicted in FIG. 9, the Label Type Format (Forms) Database 1214' records would correlate a media label type identifier to a media type, (or media label type) and orientation format. In alternative embodiments, a media label type identifier could correspond to a media type.

In the embodiment depicted in FIG. 9, once the user has entered the number of leading characters necessary to identify a media label type (and/or orientation), the exemplary client side user interface 1200' would receive in function 1210' the user-input leading unit ID characters 1101'.

In response to receiving the user input leading unit ID characters 1101', the exemplary client side user interface 1200' would then instruct in function 1210' the server system 1201' to retrieve in function 1213' from the Label Type Format (Forms) Database 1214' a media label type format record 1218 corresponding to the user input leading unit ID characters 1101'.

The client side 1200' would then test in function 1211' to see if any media label type format record 1218 had been found. If no media label type format record 1218 had been found, then the client side 1200' would display in function 1212' an instructive error message to the user's display monitor. If the Server Side 1201' returns a media label type format record 1218, then the client side 1200' would use the media label type format record 1218 to generate in function 1215 a label stock preview display (see, e.g., 504, FIG. 10) corresponding to the returned label format (1218).

In the exemplary embodiment depicted in FIG. 9, the exemplary client side 1200' would display in function 1216 the label stock preview display (see, e.g., 504, FIG. 10) to the user's display monitor, ending in function 1217 the initial display function of the exemplary client side user interface 1200'.

FIG. 10 is a graphic representation depicting a screen shot of an exemplary generic postage printing user interface in an exemplary embodiment of the present invention.

In the exemplary embodiment depicted in FIG. 10, the exemplary embodiment will use the form factor identification process described above to automatically identify the form factor (media type and/or orientation) according to the unit identifier 134 input by the user. Once the system has identified the form factor, the system will generate an exemplary label preview 504 such as is depicted in FIG. 10.

As depicted in FIG. 10, a sheet label preview 504 would be generated showing labels previously printed 610 as blank labels, and showing labels available for printing 607. The sequence numbers 608 of the printable labels on the sheet label stock are shown in the sheet label stock display 504. The exemplary label preview 504 would be displayed within the user interface confirming the exemplary embodiment's automatic identification of media type and orientation based on the user's input of the unit identifier.

As depicted in FIG. 10, a postage amount input field 620-*a* would be provided that would be adapted for receiving a user's input of an amount of postage for printing on each label that the user identifies as a target for printing postage indicia. Alternatively, the user could use the postage amount denomination pull down menu button 620-*b* to pull down a menu of pre-identified postage denominations (not shown).

In the exemplary embodiment, the sheet label preview 504 would be interactive so that a user could click on one or more labels on the sheet label preview 504, e.g. labels 624 and 625, to indicate particular physical labels on the label stock bearing the unit identifier 134 corresponding to the sheet label preview labels 624 and 625 as targets for printing postage indicia with a postage indicia amount equivalent to the postage amount that the user input into the postage amount input field 620-*a*.

Once the exemplary embodiment receives a user's indication of a form factor and/or orientation, the user's indication of one or more postage labels on which to print postage indicia, and a postage amount, the exemplary embodiment would determine a set of postage indicia format information corresponding to the format identifier. In the exemplary embodiment, the format identifier would comprise an indication of the media type and an indication of the label orientation. In the exemplary embodiment, the set of postage indicia format information would comprise information regarding orientation of the postage indicia. In various embodiments, the set of postage indicia format information would also comprise one or more of the following: size information for each label on the sheet, dimensions of each label on the sheet, position information for space adapted for receiving postage indicia on each label on the sheet, or a set of label configuration information.

In the exemplary embodiment, postage-indicia formatting programming instructions for each media type and label orientation combination would be provided. In various embodiments, the above-mentioned postage indicia format information would be provided, and specific postage indicia formatting requirements would be calculated. In such various indicia formatting calculation embodiments, in response to a user entering a unit identifier and/or label identifier, the system would access the forms database to determine from the unit identifier and/or label identifier a particular media type corresponding to the serial number. Once the exemplary system accesses the forms database and locates the forms database record corresponding to the particular media, the system would then use the forms database media type information, such as size, dimension and configuration features information, to calculate a size and/or print location of the Data Matrix (or other barcode) for each particular generic postage stamp ordered by the user according to the media type dimensions for the selected media, and according to the user's particular printer device.

Figure 11A:
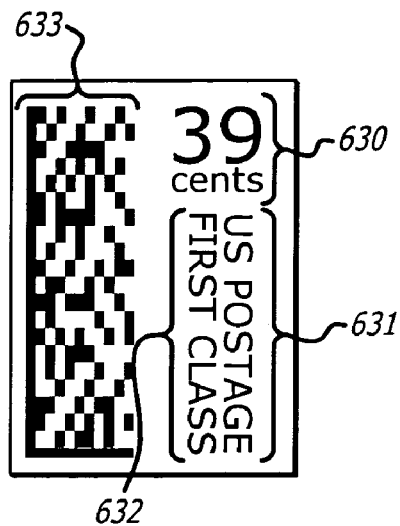
FIG. 11A is a graphic representation depicting an exemplary format of postage indicia for an exemplary landscape orientation of a postage label in an exemplary embodiment of the present invention.
Figure 11B:
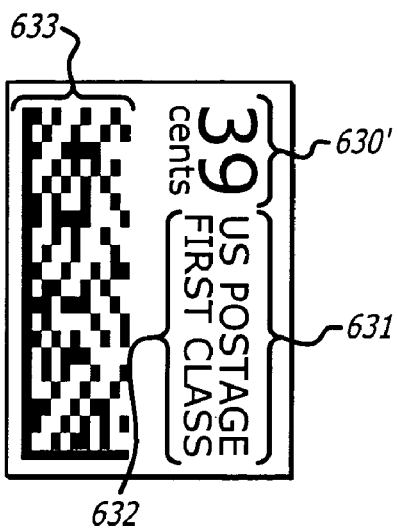
FIG. 11B is a graphic representation depicting an exemplary format of postage indicia for an exemplary portrait orientation of a postage label in an exemplary embodiment of the present invention.

It will be understood by someone with ordinary skill in the art that postage indicia may comprise both human-readable postage indicia components and machine-readable postage indicia components. With reference to FIGS. 11A and 11B, human-readable postage indicia components may comprise, for example, a human-readable postage amount 630 (FIG. 11A) and 630' (FIG. 11B) (e.g., "02 CENTS," "39 CENTS," "$4.95," etc.), a human readable mail class 632, (i.e., "FIRST CLASS," "EXPRESS," or "PRIORITY"), and/or a human-readable country identifier 631 (i.e., "US POSTAGE"). Machine-readable components may comprise a machine-readable representation 633, such as a two-dimensional barcode, of information such as a postage amount, security information, and/or mail class.

In various embodiments of the present invention, various human-readable and/or machine-readable postage indicia components could be formatted for printing differently according to the media type and the orientation of a particular label. For example, as depicted in FIG. 11A, in an exemplary format of postage indicia for an exemplary landscape orientation of a postage label, the human-readable postage indicia 630 is depicted in format that is readable left-to-right. In FIG. 11B, an exemplary format of postage indicia for an exemplary portrait orientation of a postage label depicts the human-readable postage indicia 630' in a rotated format, that, when printed on a portrait oriented postage label, would be readable left-to-right.

Figure 12A:
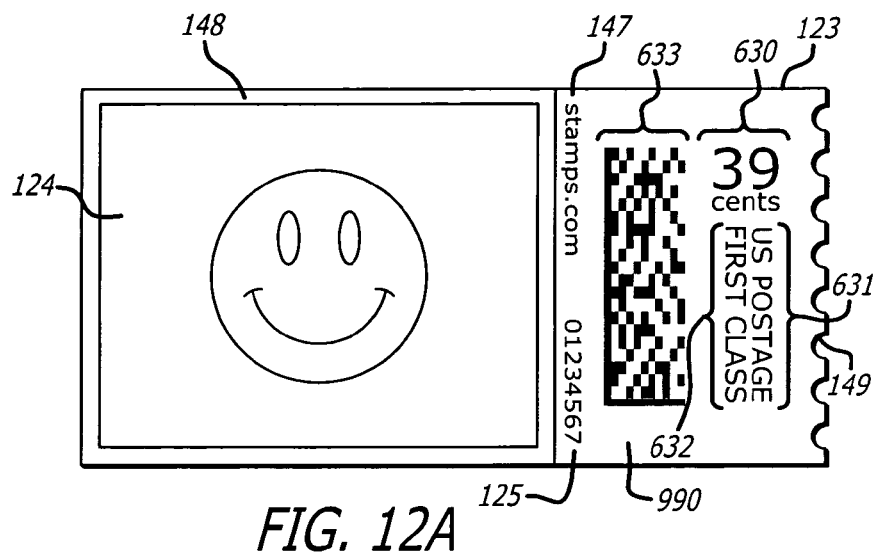
FIG. 12A is a graphic representation depicting an exemplary landscape-oriented postage label bearing postage indicia formatted in an exemplary landscape orientation format in an exemplary embodiment of the present invention.
Figure 14A:
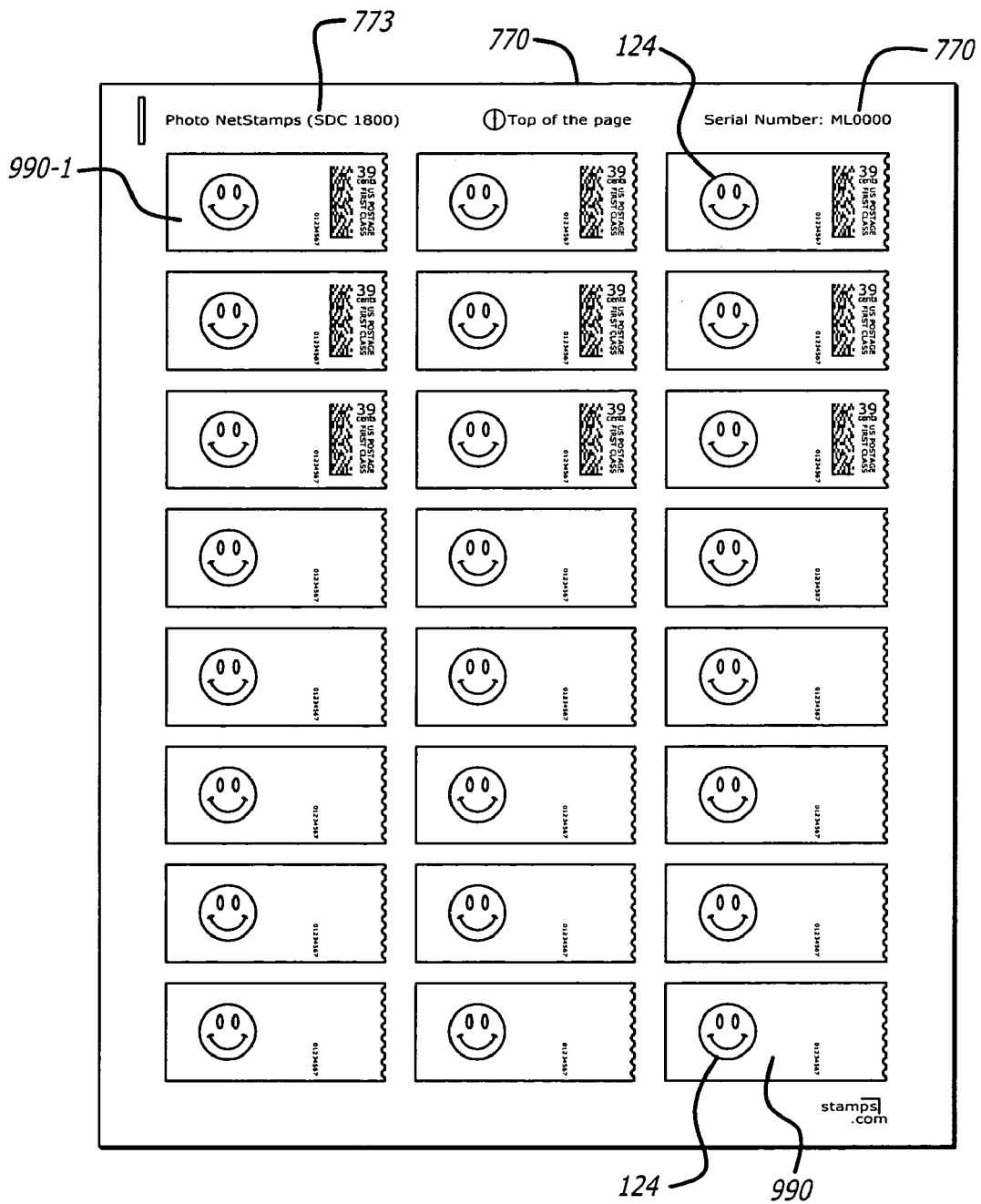
FIG. 14A is a graphic representation depicting an exemplary sheet of exemplary landscape-oriented postage labels, a plurality of which bear postage indicia formatted in an exemplary landscape orientation format in an exemplary embodiment of the present invention.

FIG. 12A is a graphic representation depicting an exemplary landscape-oriented postage label 990 bearing postage indicia formatted in an exemplary landscape orientation format in an exemplary embodiment of the present invention. As depicted in FIG. 12A, the human-readable postage indicia 630 component of the postage indicia is formatted for left-to-right reading with respect to the landscape-oriented postage indicia bearing label 990. FIG. 14A is a graphic representation depicting an exemplary sheet of exemplary landscape-oriented postage labels, e.g., label 990, a plurality of which, for example, label 990-1, bear postage indicia formatted in an exemplary landscape orientation format in an exemplary embodiment of the present invention.

Figure 12B:
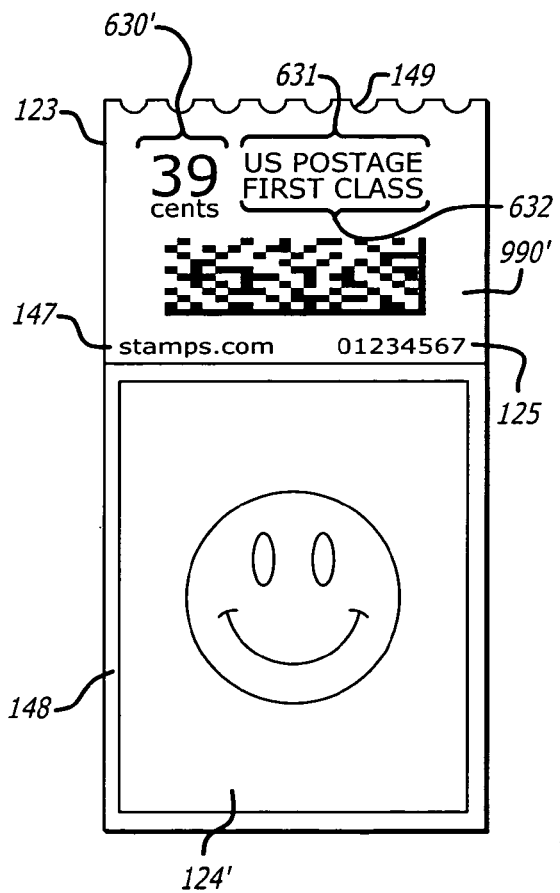
FIG. 12B is a graphic representation depicting an exemplary portrait-oriented postage label bearing postage indicia formatted in an exemplary portrait orientation format in an exemplary embodiment of the present invention.
Figure 14B:
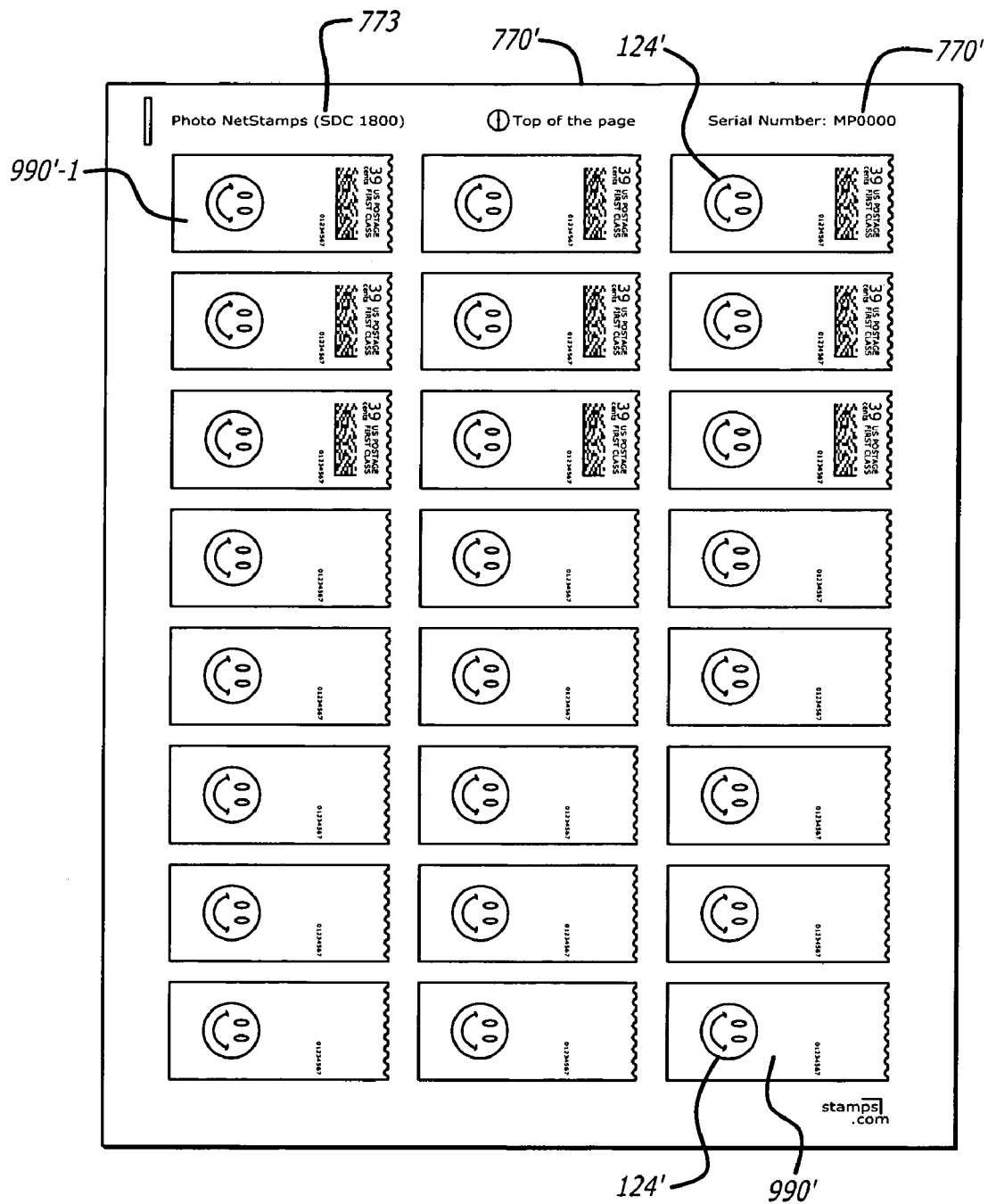
FIG. 14B is a graphic representation depicting an exemplary sheet of exemplary portrait-oriented postage labels, a plurality of which bear postage indicia formatted in an exemplary portrait orientation format in an exemplary embodiment of the present invention.

FIG. 12B is a graphic representation depicting an exemplary portrait-oriented postage label 990' bearing postage indicia formatted in an exemplary portrait orientation format in an exemplary embodiment of the present invention. As depicted in FIG. 12B, when label 990' is viewed in portrait orientation, the human-readable postage indicia 630' component of the postage indicia is formatted for left-to-right reading with respect to the portrait-oriented postage indicia bearing label 990'. FIG. 14B is a graphic representation depicting an exemplary sheet of exemplary portrait-oriented postage labels, e.g., label 990', a plurality of which, for example, label 990'-1, bear postage indicia formatted in an exemplary portrait orientation format in an exemplary embodiment of the present invention.

In the exemplary embodiment of the present invention, if the postage amount exceeds ninety-nine (99) cents, then the dollar sign ("$") would be included in the format. In the exemplary embodiment of the present invention, if the postage amount exceeds ninety-nine (99) cents, then the cents numerals would be formatted for printing in a smaller font.

In the exemplary embodiment of the present invention, the following exemplary rules would be used to format postage indicia. In the exemplary embodiment of the present invention, a machine-readable barcode will be formatted according to "IBI Lite" formatting requirements; a datamatrix barcode clear space of three-times the dot size will be provided around the entire barcode. In the exemplary embodiment of the present invention, human-readable postage indicia will be formatted to use a font size of approximately 8 point non-bold. The phrase "US POSTAGE" will always be right-aligned with the edge of the postage value. The Mail Class value will be formatted to fit tightly underneath the phrase "US POSTAGE." The font size display of the Mail Class and the phrase "US POSTAGE" will be variable depending on the size of human-readable postage amount. For example, if both the "US POSTAGE" phrase and the Mail Class will intersect with the human-readable postage amount, then the font would be scaled down to half of the size of the barcode. If just the "US POSTAGE" phrase would intersect with human-readable postage amount, then the font for Mail Class would remain constant and the font size of the phrase "US POSTAGE" would be scaled down to half of the size of the barcode. If neither the "US POSTAGE" phrase nor the Mail Class would intersect with the human-readable postage amount, the font size would not be reduced.

In the exemplary embodiment, for postage amounts less than one dollar, cent values would be formatted in full-sized font (e.g., approximately 12 point bold). In the exemplary embodiment, cent values would always be formatted with two characters (including a leading zero for single cent values). In the exemplary embodiment, no decimal signs, and no currency indicators would be provided for cents (less than one dollar); the word "cents" centered under the value. In the exemplary embodiment, for landscape-oriented labels (label stock comprising a unit identifier with the letters "ML" as the two leading characters), the cent amount would always be oriented perpendicular to the "US POSTAGE" text. In the exemplary embodiment, for portrait-oriented labels (label stock comprising a unit identifier with the letters "MP" as the two leading characters), the cent amount would always be oriented parallel to the "US POSTAGE" text.

In the exemplary embodiment, for postage amounts greater than one dollar, the human-readable postage amount would always be formatted for display parallel to the "US POSTAGE" text. If the postage amount contains no cents, then "00" would be displayed. Font sizes for the postage value will decrease slightly in size based on bounding box limitations within the barcode print area. A maximum postage amount size of $NNN.NN will be allowed.

The exemplary embodiment would be programmed to calculate, according to the set of postage indicia format information, at least one of: a printable size of a postage indicia for printing on an at least one label on the particular unit of label stock, or a print location of the postage indicia for printing on the at least one label on the particular unit of label stock.

FIG. 13 is a chart depicting various scaling of human-readable postage indicia in the exemplary embodiment of the present invention.

Returning with reference to FIG. 1, once the postage indicia has been generated and formatted for printing according to the media type and the label orientation for the ordered labe(l)s, the authorized computer-based, generic, postage provider website 19 (or alternatively, by client software enabled to communicate with the authorized computer-based, generic, postage provider website) would cause the printing of the postage indicia on a print rendering device in communication with the receiving user's client computer device 10a, such as, for example, printer 16a.

Other features of the invention are implicit in the above-provided description and/or are depicted and/or implicit in the accompanying figures.

Facsimile Reproduction of Copyright Material

A portion of the disclosure of this patent document contains material which is subject to copyright protection by the copyright owner, Stamps.com Inc., its successors and assigns. The copyright owner has no objection to the facsimile reproduction by anyone of the patent document or the patent disclosure, as it appears in the Patent and Trademark Office patent file or records, but otherwise reserves all copyright rights whatsoever.

ILLUSTRATIVE EMBODIMENTS

Although this invention has been described in certain specific exemplary embodiments, many additional modifications and variations would be apparent to those skilled in the art. For example, the present invention may be implemented by a variety of generic postage metering systems in accordance with a variety of print requirements promulgated by postal systems around the world. Further, although the operation of the present invention has been demonstrated in accordance with USPS requirements for PC based postal printing, the present invention is not limited to applications in accordance with the USPS requirements. Rather, the present invention is equally applicable for operation in various PC postal printing and Value Bearing Item indicia printing systems. It is, therefore, to be understood that this invention may be practiced otherwise than as specifically described. Moreover, to those skilled in the various arts, the invention itself herein will suggest solutions to other tasks and adaptations for other applications. Thus, the embodiments of the invention described herein should be considered in all respects as illustrative and not restrictive, the scope of the invention to be determined by the appended claims and their equivalents rather than the foregoing description.

What is claimed is:

1. A method for selecting a format for which to generate postage indicia, said method comprising:

displaying to a display device in communication with a computer device, an input field for inputting a control number input;

receiving from a user, via the computer device, the control number input, wherein the control number input comprises a format identifier that corresponds to a particular type of label stock, wherein the format identifier comprises a plurality of characters, wherein a subset of characters of the plurality of characters that comprise the format identifier comprises a media type format identifier and a postage indicia orientation format identifier, and wherein a particular unit of the particular type of label stock comprises a plurality of labels;

receiving from the user, via the computer device, a request for a postage indicia;

identifying a set of postage indicia format information corresponding to the media type format identifier and the postage indicia orientation format identifier, for formatting and orienting at least one postage label, wherein the set of postage indicia format information comprises print orientation information for formatting the postage indicia on an at least one label on the particular unit of label stock according to the orientation indicator, and at least one of: a label size, a set of label dimensions, or a set of label configuration information; and calculating, according to the set of postage indicia format information: a printable size of the postage indicia for printing on the at least one label on the particular unit of label stock, and a print location and a print orientation of the postage indicia for printing on the at least one label on the particular unit of label stock.

2. The method of claim 1, said method further comprising: generating a label stock preview display of the particular unit of label stock for display on the display device, wherein said label stock preview display is generated in a format according to the set of postage indicia format information and according to the printable size, the print location and the print orientation.

3. The method of claim 1, said method further comprising: generating at least one postage indicia for printing on the at least one label on the particular unit of label stock in a format according to the set of postage indicia format information and according to the printable size, the print location and the print orientation.

4. The method of claim 1, wherein each label of the plurality of labels comprises a width and a height, and wherein the width and the height of a particular label of the plurality of labels is equal to the width and height of each label of the plurality of labels.

5. The method of claim 4, wherein the postage indicia orientation format identifier comprises an orientation indicator selected from the group consisting of: 1) a portrait orientation, and 2) a landscape orientation.

6. The method of claim 1, wherein the postage indicia orientation format identifier comprises an indication of an orientation selected from the group consisting of: 1) a portrait orientation, and 2) a landscape orientation.

7. The method of claim 1, wherein the particular unit of the particular type of label stock comprises a roll of a plurality of labels.

8. The method of claim 1, wherein the format identifier comprises a single leading character of the serial number.

9. The method of claim 1, wherein the format identifier comprises a plurality of leading characters of the serial number.

10. A method for identifying to a system, a format for generating a postage indicia, said method comprising:

displaying on a particular unit of label stock, a format identifier, wherein the format identifier comprises a plurality of characters, wherein a subset of characters of the plurality of characters that comprise the format identifier comprises an indication of a media type format identifier and of a postage indicia orientation format identifier, wherein the media type format identifier corresponds to a particular media type, wherein the postage indicia orientation format identifier corresponds to a particular postage indicia orientation format, and wherein the particular media type corresponds to a set of media type information;

identifying the set of media type information that corresponds to the media type format identifier;

identifying the particular postage indicia orientation format that corresponds to the postage indicia orientation format identifier;

receiving an input by a user, via a computer device, of at least the format identifier and an amount of postage; and responding to the input by the user by generating a printable format of at least one postage indicia for printing on an at least one label of the label stock, wherein the printable format of the at least one postage indicia is generated in a format and in an orientation for printing according to the set of media type information that corresponds to the media type format identifier, and according to the particular postage indicia orientation format that corresponds to the postage indicia orientation format identifier.

11. The method of claim 10, wherein each unit of label stock comprises a plurality of labels.

12. The method of claim 11, wherein each label on a particular unit of label stock bears a distinct control number.

13. The method of claim 11, said method further comprising:
tracking each label on the particular unit of label stock for which a value-bearing item indicia has been generated.

14. The method of claim 11, wherein each label of the plurality of labels comprises a width and a height, and wherein the width and the height of a particular label of the plurality of labels is equal to the width and height of each other label of the plurality of labels.

15. The method of claim 10, wherein the particular postage indicia orientation format is selected from a group consisting of: 1) a portrait orientation, and 2) a landscape orientation.

16. The method of claim 15, wherein each unit of label stock comprises a plurality of labels, and wherein each label of the plurality of labels comprises a width and a height, and wherein the width and the height of a particular label of the plurality of labels is equal to the width and height of each other label of the plurality of labels.

17. The method of claim 10, wherein the media type format identifier comprises a single leading character of the format identifier.

18. The method of claim 10, wherein the media type format identifier comprises a plurality of leading characters of the format identifier.

19. A method for identifying to a computer-based value-bearing item indicia system, a format for generating a value-bearing item indicia, said method comprising:

A) displaying on a particular unit of label stock that comprises a plurality of same-sized labels, a format identifier that corresponds to a format of each label of the plurality of same-sized labels, wherein the format identifier comprises an indication of a media type format, wherein the media type format corresponds to a particular media type, and wherein the particular media type corresponds to a set of media type information;

B) receiving via a computer device, an input by a user comprising an indication of an amount of value for generating value-bearing item indicia, and the format identifier;

C) determining the set of media type information that corresponds to the format identifier; and D) in response to the input by the user of the amount of value for generating value-bearing item indicia, and the format identifier, generating a printable format of at least one value-bearing item indicia for printing on an at least one label, of the label stock, wherein the printable format of the at least one value-bearing item indicia is generated in a format according to the set of media type information.

20. The method of claim 19, wherein the input by the user further comprises an indication of a value-bearing item indicia orientation format that is selected from a group consisting of: 1) a portrait orientation, and 2) a landscape orientation; and wherein D) comprises:
in response to the input by the user of the amount of value for generating value-bearing item indicia, the format identifier, and the indication of the value-bearing item indicia orientation, generating a printable format of at least one value-bearing item indicia for printing on an at least one label of the label stock, wherein the printable format of the at least one value-bearing item indicia is generated in a format according to the set of media type information, and according to the indication of the value-bearing item indicia orientation.

21. The method of claim 20, wherein the printable format of the at least one value-bearing item indicia is generated in a format according to the set of media type information, according to the indication of the value-bearing item indicia orientation, and further according to a magnitude of the amount.

22. The method of claim 20, said method further comprising, prior to process B):
determining a pattern of ink for application to each label of the plurality of same-sized labels, wherein the pattern is determined according to the media type format and according to indication of the value-bearing item indicia orientation; and
applying the pattern of ink to each label of the plurality of same-sized labels.

23. A unit of label stock, said unit of label stock comprising:
a plurality of die-cut labels, wherein each label comprises a user-selected, user-manipulated image, and wherein each label further comprises an area adapted for receiving printing of value-bearing item indicia; and
a unit identifier that comprises an indication of a media type and further comprises an indication of a postage indicia orientation.

24. The unit of label stock of claim 23, said unit of label stock further comprising:
a roll of die-cut labels, wherein the unit identifier is repeated in a plurality of display positions on the roll.

25. A method for printing labels adapted for receiving value-bearing item indicia, said method comprising:
receiving from a user a selection of a graphic image to be displayed on a plurality of labels;
receiving from the user an indication of an orientation of value-bearing item indicia for printing on the plurality of labels;
rendering on a unit of label stock an image of a unit identifier, wherein the unit identifier comprises an indication of a media type of labels;
rendering on the unit of label stock a plurality of displays of the graphic image; and
kiss-cutting a respective label perimeter corresponding to each display of the graphic image, wherein the respective label perimeter corresponds to the media type.

26. The method of claim 25, wherein the unit identifier further comprises an indication of the orientation.

* * * * *